(12) United States Patent
Wang et al.

(10) Patent No.: US 10,405,343 B2
(45) Date of Patent: Sep. 3, 2019

(54) RADIO FRAME TRANSMISSION METHOD AND WIRELESS NETWORK DEVICE

(71) Applicant: Huawei Technologies Co., Ltd., Shenzhen (CN)

(72) Inventors: Ting Wang, Shanghai (CN); Yuanjie Li, Shanghai (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/011,128

(22) Filed: Jun. 18, 2018

(65) Prior Publication Data

US 2018/0302921 A1  Oct. 18, 2018

Related U.S. Application Data

(63) Continuation of application No. PCT/CN2016/110188, filed on Dec. 15, 2016.

(30) Foreign Application Priority Data

Dec. 18, 2015 (CN) .......................... 2015 1 0956990

(51) Int. Cl.
*H04W 74/00* (2009.01)
*H04W 74/08* (2009.01)

(52) U.S. Cl.
CPC ....... *H04W 74/006* (2013.01); *H04W 74/002* (2013.01); *H04W 74/08* (2013.01); *H04W 74/0891* (2013.01)

(58) Field of Classification Search
CPC ............. H04W 74/006; H04W 74/002; H04W 74/0891; H04W 74/08
See application file for complete search history.

(56) References Cited

U.S. PATENT DOCUMENTS

2012/0063393 A1* 3/2012 Du ................... H04W 36/0077
370/329
2012/0149428 A1* 6/2012 Yang ................ H04W 56/0045
455/524

(Continued)

FOREIGN PATENT DOCUMENTS

| CN | 103379072 A | 10/2013 |
|----|-------------|---------|
| CN | 103796330 A | 5/2014  |
| CN | 103916974 A | 7/2014  |

OTHER PUBLICATIONS

ZTE, "UL framework for LAA," 3GPP TSG RAN WG1 Meeting #83, R1-156994, Anaheim, USA, Nov. 15-22, 2015, 6 pages.

(Continued)

*Primary Examiner* — Curtis A Alia
(74) *Attorney, Agent, or Firm* — Slater Matsil, LLP

(57) ABSTRACT

Embodiments of the present invention disclose a radio frame transmission method and a wireless network device. The method includes: receiving PRACH trigger information that is carried in a first transmission subframe in a first radio frame and that is sent by a first wireless network device; and sending, to the first wireless network device in response to the PRACH trigger information, a preamble sequence carried in a second transmission subframe in a second radio frame, where there is a preset first mapping relationship between a subframe number of the first transmission subframe and a subframe number of the second transmission subframe, and a structure of a transmission subframe in the first radio frame is different from a structure of a transmission subframe in the second radio frame.

19 Claims, 16 Drawing Sheets

(56) References Cited

U.S. PATENT DOCUMENTS

| | | |
|---|---|---|
| 2013/0242730 A1 | 9/2013 | Pelletier et al. |
| 2014/0105152 A1* | 4/2014 | Wu .................. H04W 74/0866 370/329 |
| 2016/0204927 A1* | 7/2016 | Yi ....................... H04B 7/2615 370/280 |
| 2018/0014279 A1 | 1/2018 | Xia et al. |

OTHER PUBLICATIONS

Fujitsu, "RA procedure on SCell," 3GPP TSG-RAN WG2 Meeting #74, R2-113038, Barcelona, Spain, May 9-13, 2011, 2 pages.

* cited by examiner

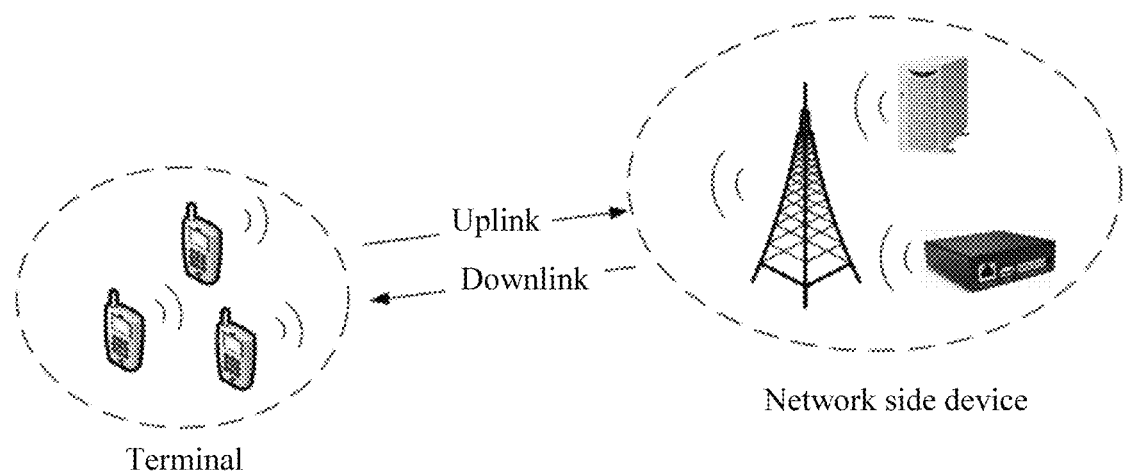
FIG. 1
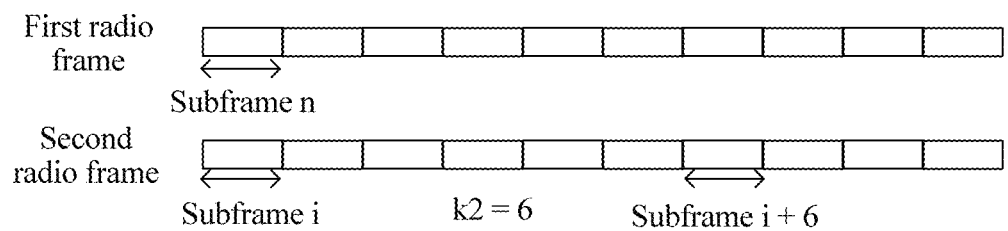
FIG. 1.1

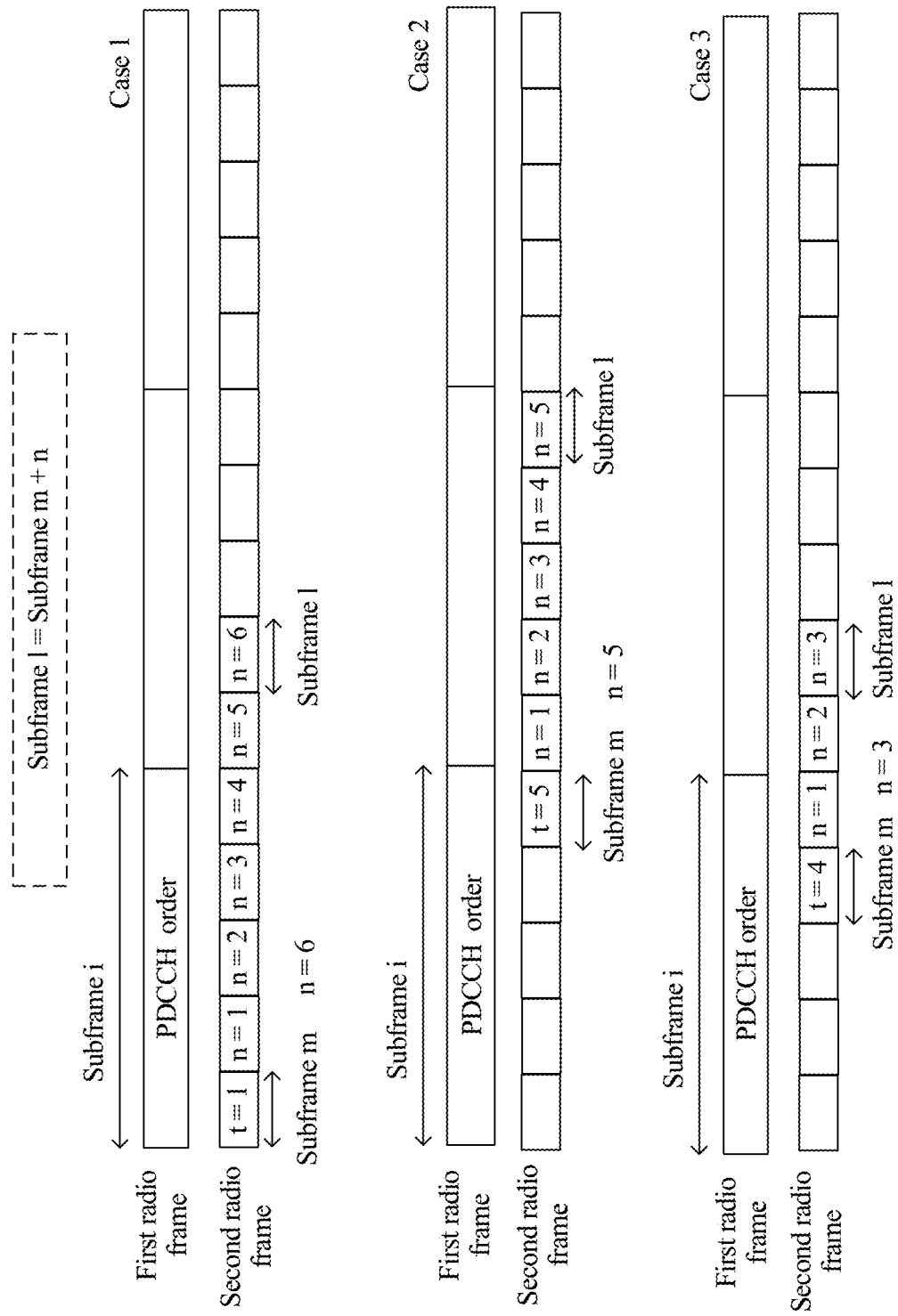
FIG. 2.1

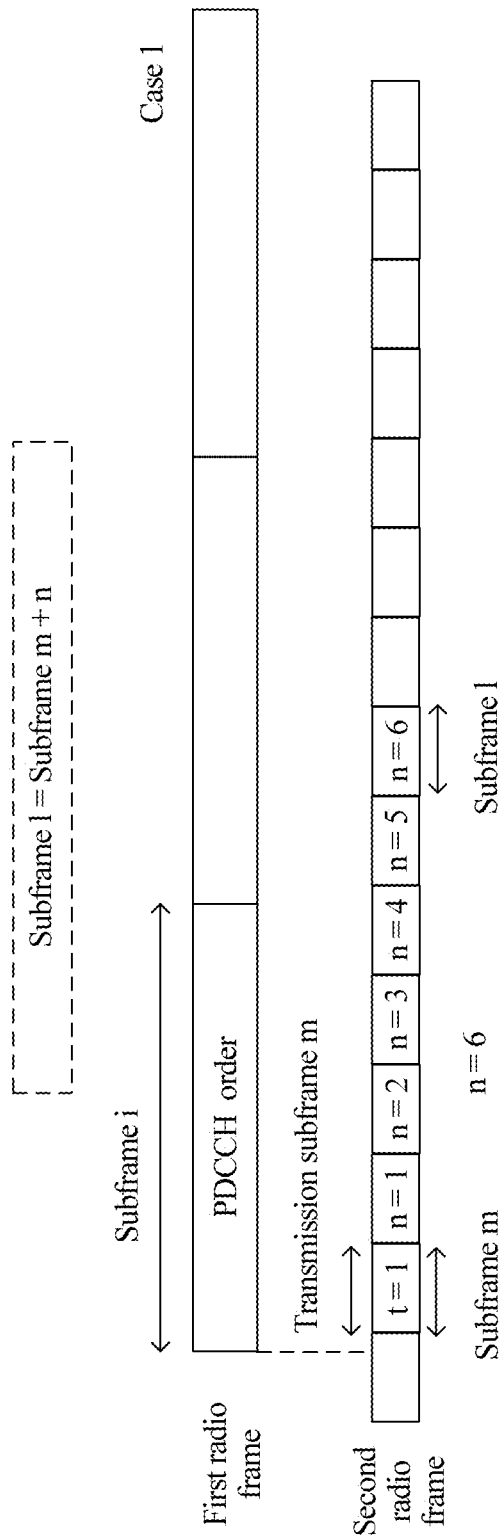
FIG. 2.1-a

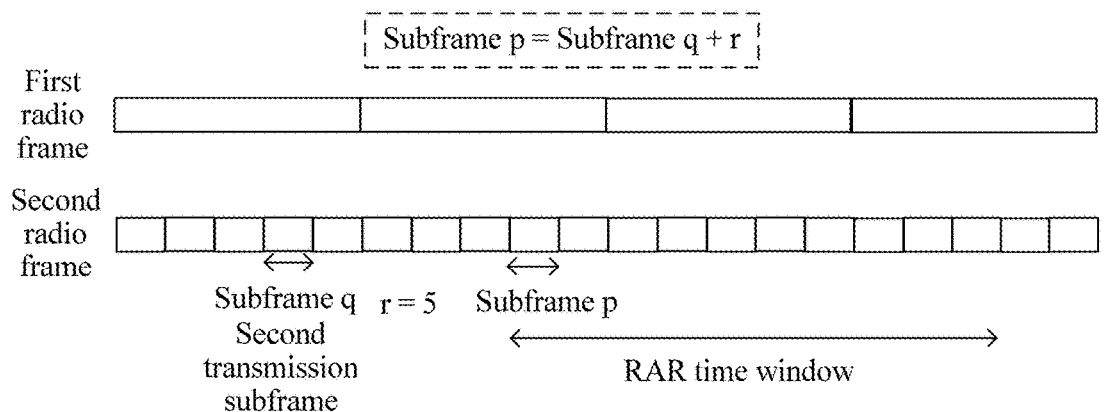
FIG. 2.2
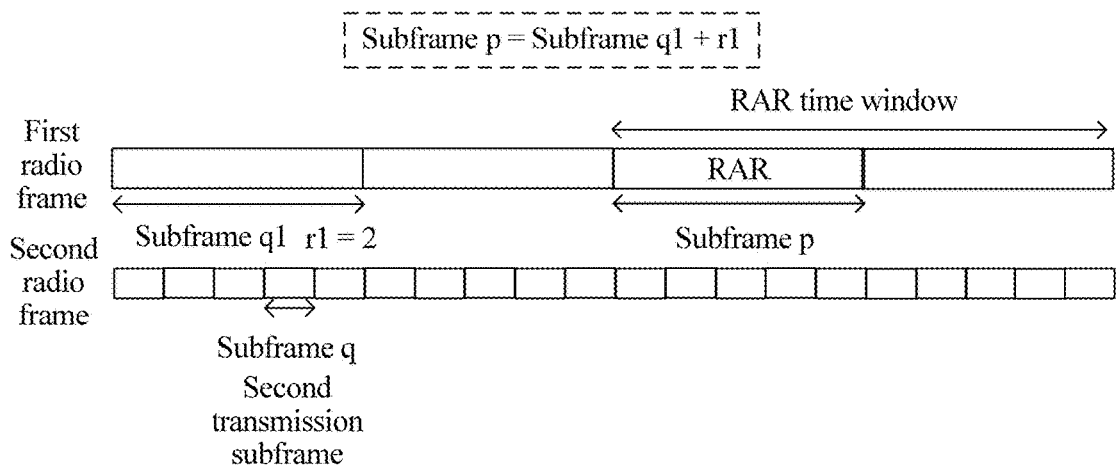
FIG. 2.3

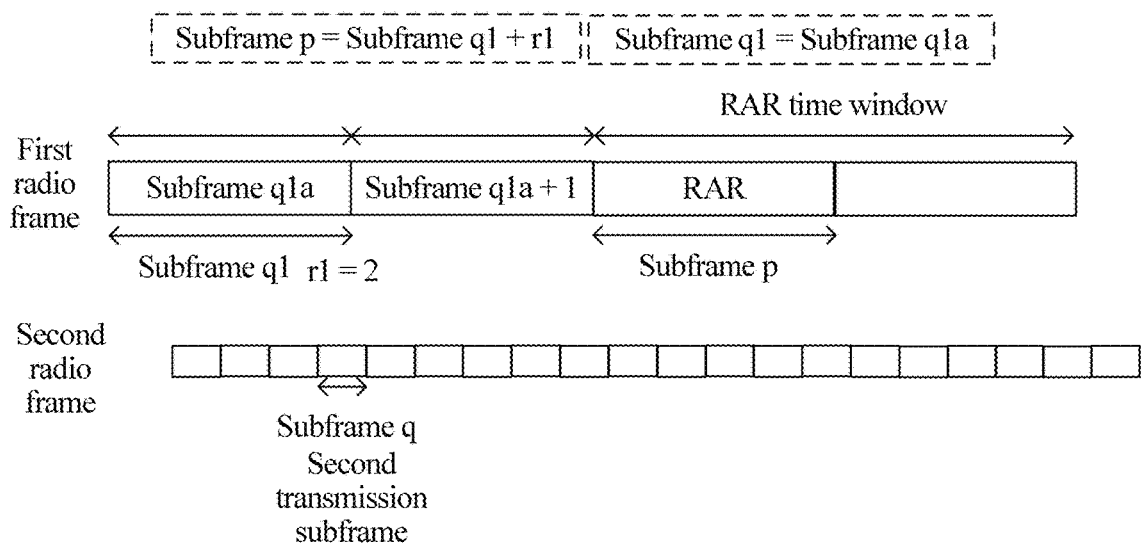
FIG. 2.3-a

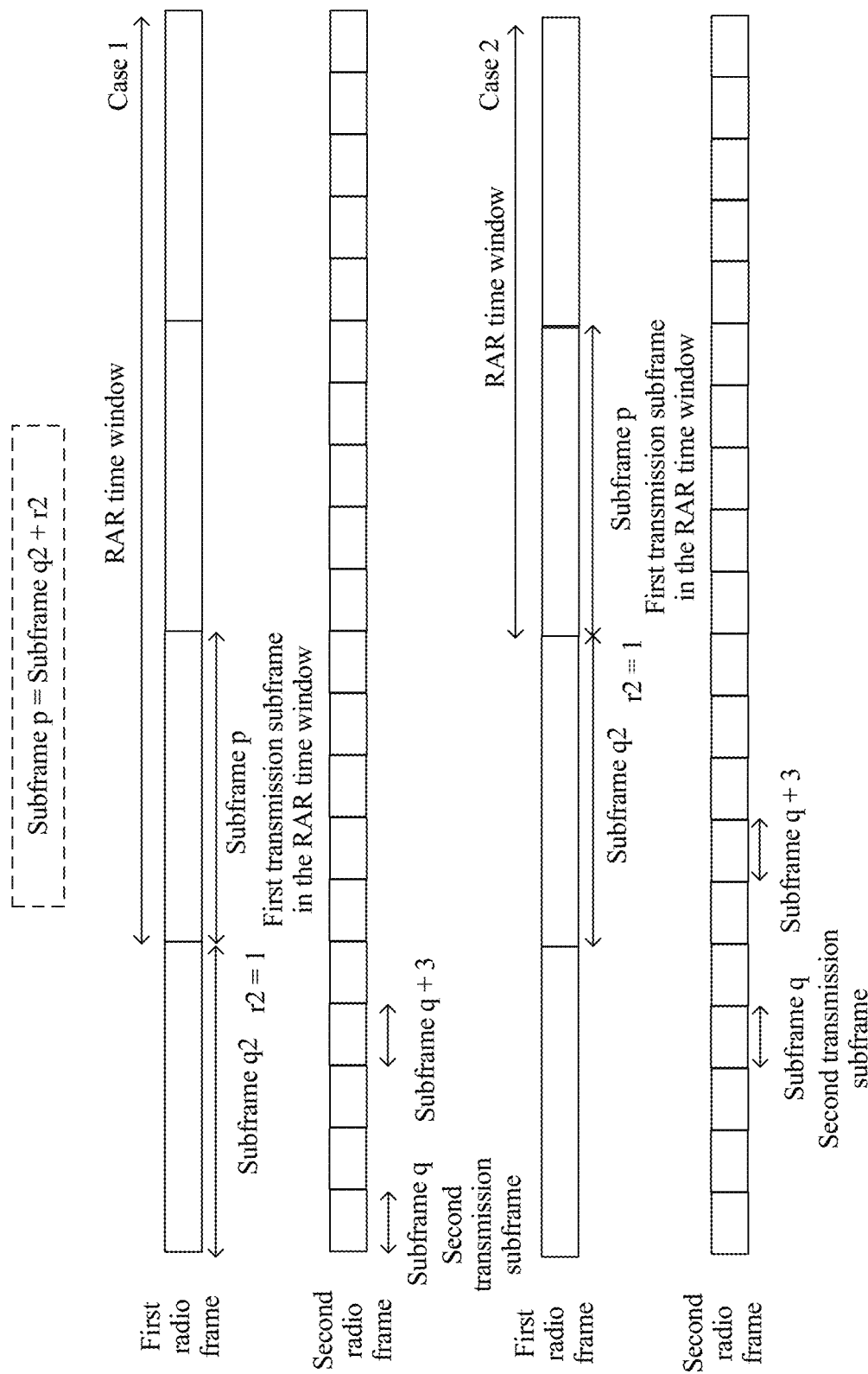
FIG. 2.4

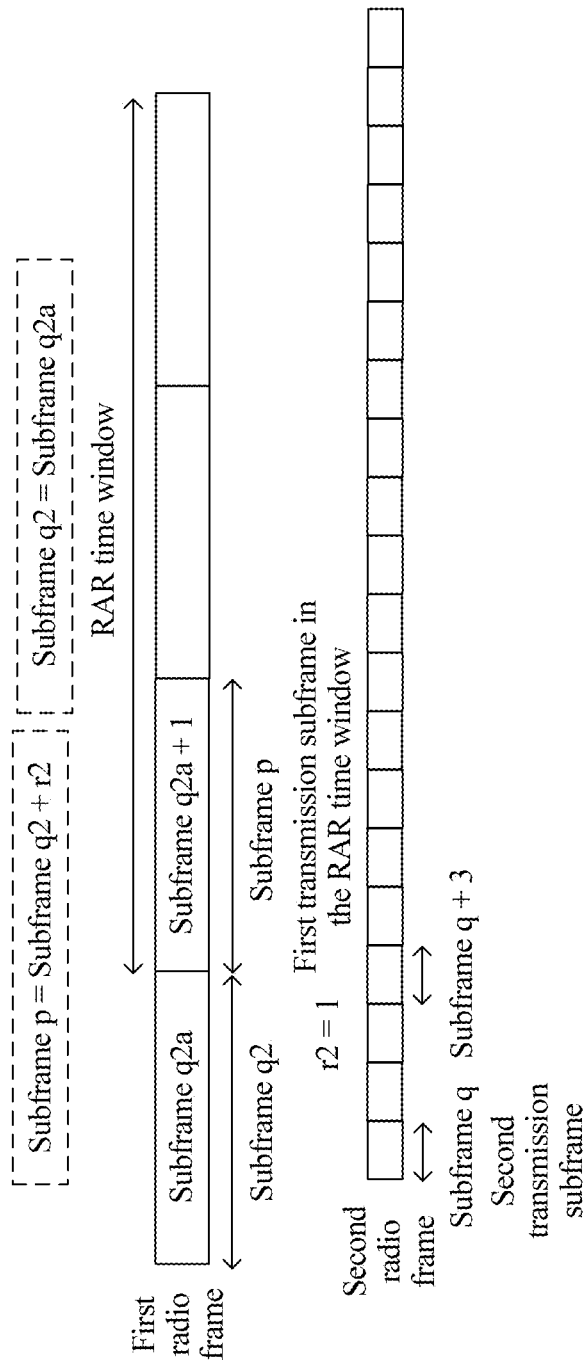
FIG. 2.4-a

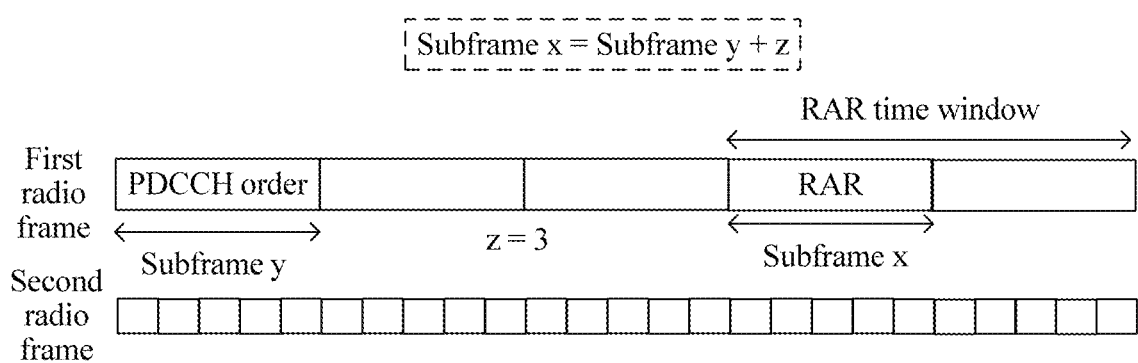
FIG. 2.5

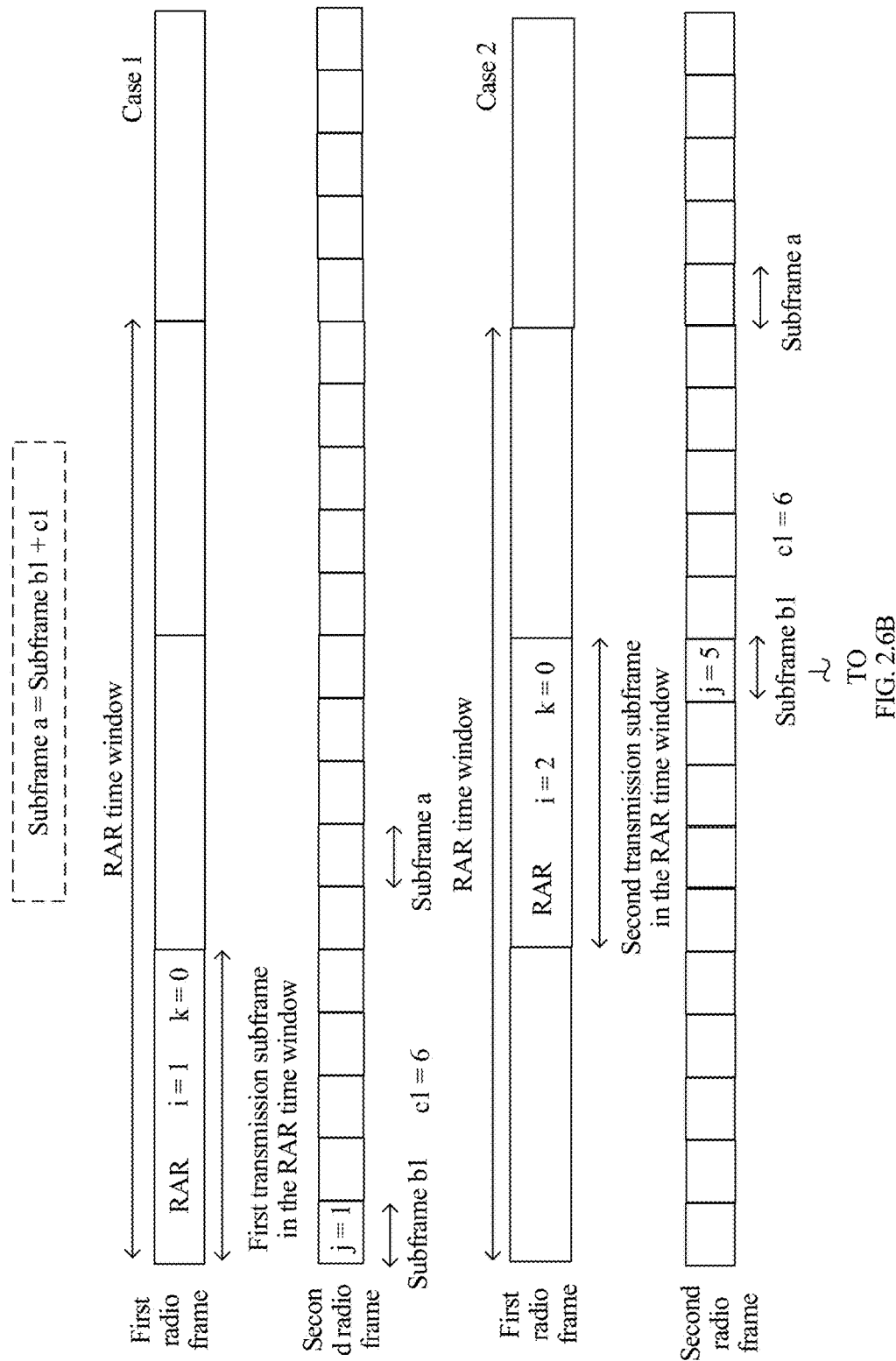
FIG. 2.6A

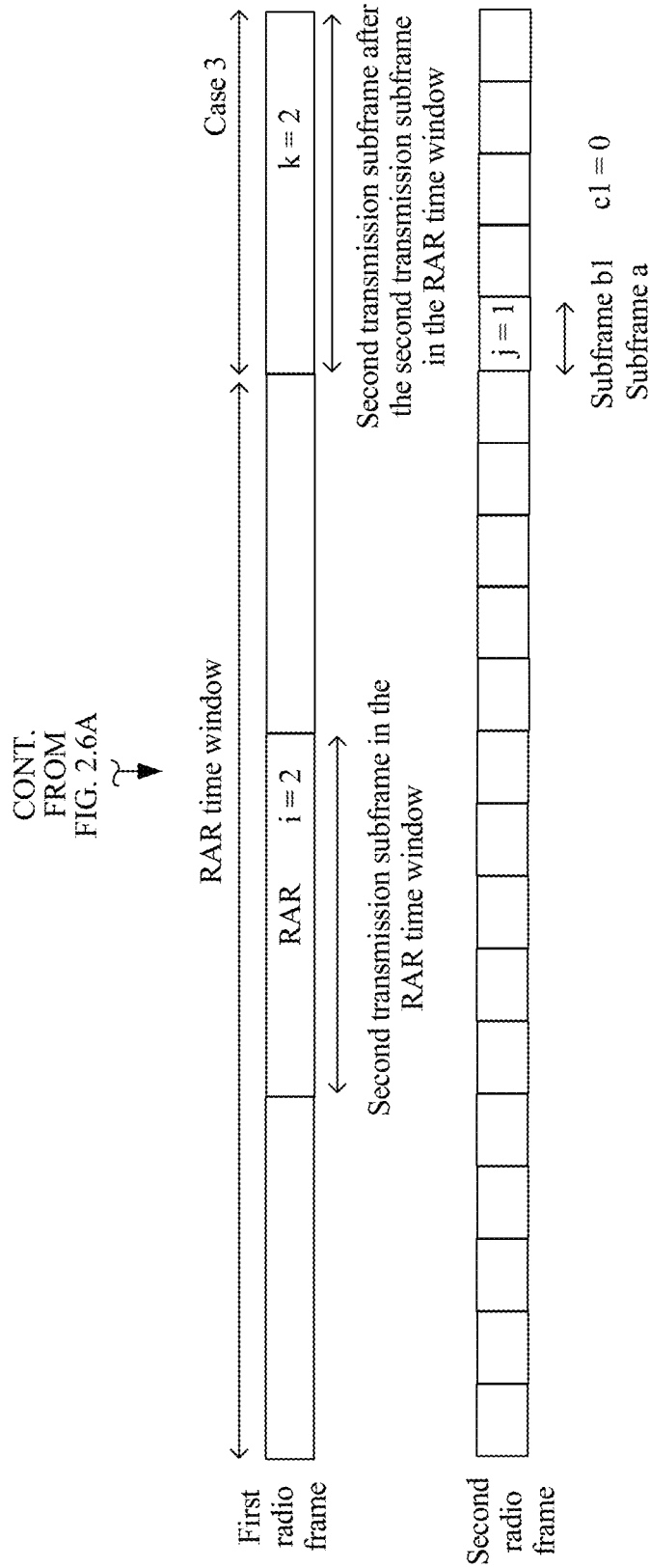
FIG. 2.6B

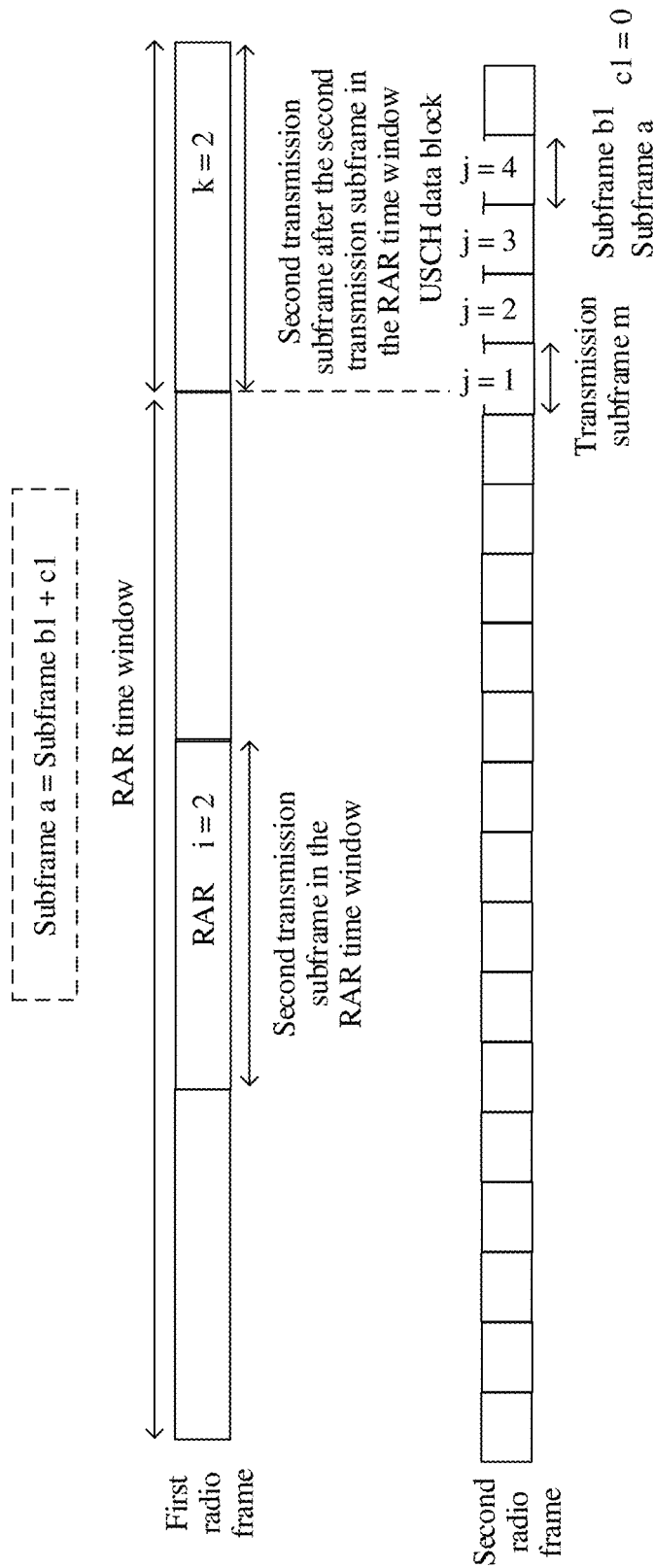
FIG. 2.6-a

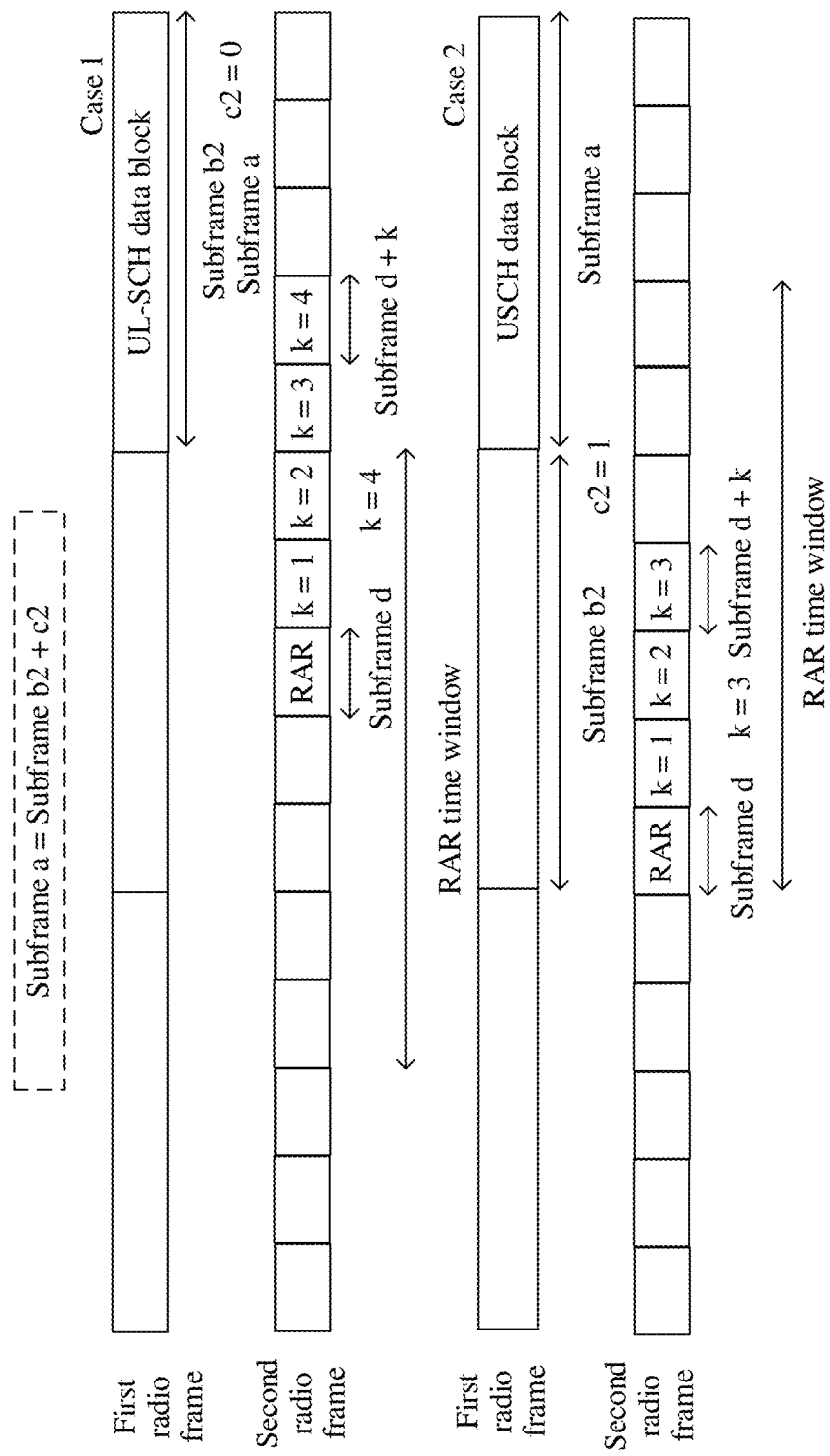
FIG. 2.7

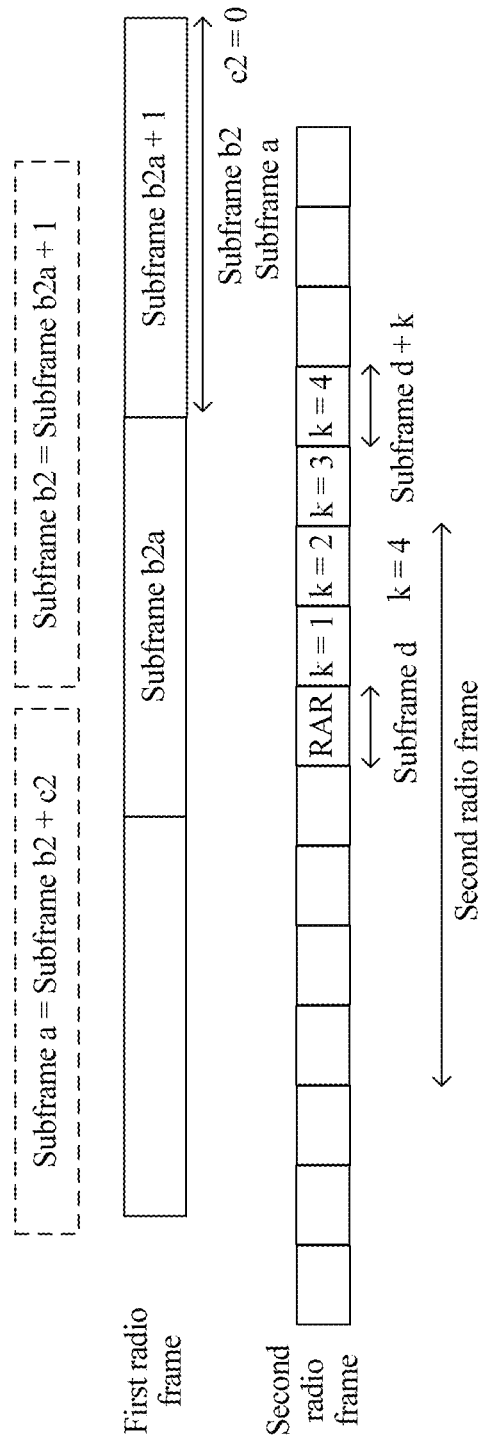
FIG. 2.7-a

RADIO FRAME TRANSMISSION METHOD AND WIRELESS NETWORK DEVICE

CROSS-REFERENCE TO RELATED APPLICATIONS

This application is a continuation of International Application No. PCT/CN2016/110188, filed on Dec. 15, 2016, which claims priority to Chinese Patent Application No. 201510956990.0, filed on Dec. 18, 2015. The disclosures of the aforementioned applications are hereby incorporated by reference in their entireties.

TECHNICAL FIELD

Embodiments of the present invention relate to the field of wireless communications technologies, and in particular, to a radio frame transmission method and a wireless network device.

BACKGROUND

In a wireless communications system, a PRACH (physical random access channel) is used for random access, and is a path on which user equipment establishes an initial connection, performs handover, re-establishes a connection, and resumes uplink synchronization. PRACH scheduling transmission is a process in which wireless network devices in the wireless communications system determine a preamble sequence of an access channel by means of information interaction.

For a requirement for the PRACH scheduling transmission, a specific interaction solution is proposed in an existing protocol to implement PRACH scheduling transmission between a base station and user equipment. However, the existing interaction solution is only applicable to an application scenario in which a frame structure of an uplink transmission subframe is the same as a frame structure of a downlink transmission subframe. For an application scenario in which transmission subframes have different frame structures, there is currently no solution for implementing PRACH scheduling transmission between wireless network devices.

SUMMARY

Embodiments of the present invention provide a radio frame transmission method and a wireless network device, so as to implement PRACH scheduling transmission between wireless network devices based on cooperation between radio frames with different structures.

A first aspect of the embodiments of the present invention provides a radio frame transmission method. The method includes receiving, by a second wireless network device, PRACH trigger information sent by a first wireless network device, where the PRACH trigger information is carried in a first transmission subframe in a first radio frame. The method also includes sending, by the second wireless network device, a preamble sequence to the first wireless network device in response to the PRACH trigger information, where the preamble sequence is carried in a second transmission subframe in a second radio frame. There is a preset first mapping relationship between a subframe number of the first transmission subframe and a subframe number of the second transmission subframe, and a structure of a transmission subframe in the first radio frame is different from a structure of a transmission subframe in the second radio frame.

In this way, PRACH scheduling transmission in a wireless communications system can be implemented based on cooperation between radio frames with different structures.

In a first possible implementation of the first aspect, after the second wireless network device sends, to the first wireless network device, the preamble sequence carried in the second transmission subframe in the second radio frame, the second wireless network device further performs the following operation: detecting, by the second wireless network device in a random access response (RAR) time window, an RAR sent by the first wireless network device, where the RAR sent by the first wireless network device is carried in a third transmission subframe, the RAR time window includes N transmission subframes, the third transmission subframe is any one of the N transmission subframes, and N is a positive integer. There is a preset second mapping relationship between a subframe number of the first transmission subframe in the RAR time window and the subframe number of the second transmission subframe.

In a second possible implementation of the first aspect, after sending, to the first wireless network device, the preamble sequence carried in the second transmission subframe in the second radio frame, the second wireless network device further performs the following operation: detecting, by the second wireless network device in a random access response (RAR) time window, an RAR sent by the first wireless network device, where the RAR sent by the first wireless network device is carried in a third transmission subframe, the RAR time window includes N transmission subframes, and N is a positive integer. There is a preset third mapping relationship between a subframe number of the first transmission subframe in the RAR time window and the subframe number of the first transmission subframe.

With reference to the first or the second possible implementation of the first aspect, in a third possible implementation of the first aspect, the second wireless network device further performs the following operation: if it is detected that an $i^{th}$ transmission subframe in the RAR time window carries physical downlink control channel (PDCCH) information scrambled by a random access radio network temporary identifier (RA-RNTI), and that a downlink data block corresponding to the PDCCH information includes the preamble sequence, sending, by the second wireless network device to the first wireless network device, an uplink shared channel (USCH) data block carried in a fourth transmission subframe. There is a preset fourth mapping relationship between a subframe number of the fourth transmission subframe and a subframe number of the $i^{th}$ transmission subframe in the RAR time window, and i is a positive integer less than or equal to N.

A second aspect of the embodiments of the present invention provides a radio frame transmission method. The method includes sending, by a first wireless network device, physical random access channel (PRACH) trigger information to a second wireless network device, where the PRACH trigger information is carried in a first transmission subframe in a first radio frame. The method also includes receiving, by the first wireless network device, a preamble sequence sent by the second wireless network device in response to the PRACH trigger information, where the preamble sequence is carried in a second transmission subframe in a second radio frame. There is a preset first mapping relationship between a subframe number of the first transmission subframe and a subframe number of the second transmission subframe, and a structure of a transmission subframe in the first radio frame is different from a structure of a transmission subframe in the second radio frame.

In a first possible implementation of the second aspect, after the first wireless network device receives the preamble sequence that is carried in the second transmission subframe in the second radio frame and that is sent by the second wireless network device in response to the PRACH trigger information, the first wireless network device further performs the following operation: sending, by the first wireless network device to the second wireless network device, a random access response (RAR) carried in a third transmission subframe, where the third transmission subframe is any one of N transmission subframes, the N transmission subframes form an RAR time window used to detect the RAR, and N is a positive integer greater than 1. There is a preset second mapping relationship between a subframe number of the first transmission subframe in the RAR time window and the subframe number of the second transmission subframe.

In a second possible implementation of the second aspect, after the first wireless network device receives the preamble sequence that is carried in the second transmission subframe in the second radio frame and that is sent by the second wireless network device in response to the PRACH trigger information, the first wireless network device further performs the following operation: sending, by the first wireless network device, a random access response (RAR) to the second wireless network device, where the RAR is carried in a third transmission subframe, the third transmission subframe is any one of N transmission subframes, the N transmission subframes form an RAR time window used to detect the RAR, and N is a positive integer greater than 1. There is a preset third mapping relationship between a subframe number of the first transmission subframe in the RAR time window and the subframe number of the first transmission subframe.

With reference to the first or the second possible implementation of the second aspect, in a third possible implementation of the second aspect, the first wireless network device further performs the following operation: receiving, by the first wireless network device, an uplink shared channel (USCH) data block sent by the second wireless network device, where the USCH data block is carried in a fourth transmission subframe, and the USCH data block is sent by the second wireless network device when it is detected that an $i^{th}$ transmission subframe in the RAR time window carries physical downlink control channel (PDCCH) information scrambled by a random access radio network temporary identifier (RA-RNTI), and that a downlink data block corresponding to the PDCCH information includes the preamble sequence. There is a preset fourth mapping relationship between a subframe number of the fourth transmission subframe and a subframe number of the $i^{th}$ transmission subframe in the RAR time window, and i is a positive integer less than or equal to N.

A third aspect of the embodiments of the present invention provides a radio frame transmission method. The method includes receiving, by a second wireless network device, PRACH trigger information sent by a first wireless network device, where the PRACH trigger information is carried in a first transmission time unit in a first radio frame. The method also includes sending, by the second wireless network device, a preamble sequence to the first wireless network device in response to the PRACH trigger information, where the preamble sequence is carried in a second transmission time unit in a second radio frame. There is a preset first mapping relationship between a time unit index of the first transmission time unit and a time unit index of the second transmission time unit, and a structure of a transmission time unit in the first radio frame is different from a structure of a transmission time unit in the second radio frame.

In this way, PRACH scheduling transmission in a wireless communications system can be implemented based on cooperation between radio frames with different structures.

In a first possible implementation of the third aspect, after the second wireless network device sends, to the first wireless network device, the preamble sequence carried in the second transmission time unit in the second radio frame, the second wireless network device further performs the following operation: detecting, by the second wireless network device in a random access response (RAR) time window, an RAR sent by the first wireless network device, where the RAR sent by the first wireless network device is carried in a third transmission time unit, the RAR time window includes N transmission time units, the third transmission time unit is any one of the N transmission time units, and N is a positive integer. There is a preset second mapping relationship between a time unit index of the first transmission time unit in the RAR time window and the time unit index of the second transmission time unit.

In a second possible implementation of the third aspect, after sending, to the first wireless network device, the preamble sequence carried in the second transmission time unit in the second radio frame, the second wireless network device further performs the following operation: detecting, by the second wireless network device in a random access response (RAR) time window, an RAR sent by the first wireless network device, where the RAR sent by the first wireless network device is carried in a third transmission time unit, the RAR time window includes N transmission time units, and N is a positive integer. There is a preset third mapping relationship between a time unit index of the first transmission time unit in the RAR time window and the time unit index of the first transmission time unit.

With reference to the first or the second possible implementation of the third aspect, in a third possible implementation of the third aspect, the second wireless network device further performs the following operation: if it is detected that an $i^{th}$ transmission time unit in the RAR time window carries physical downlink control channel (PDCCH) information scrambled by a random access radio network temporary identifier (RA-RNTI), and that a downlink data block corresponding to the PDCCH information includes the preamble sequence, sending, by the second wireless network device to the first wireless network device, an uplink shared channel (USCH) data block carried in a fourth transmission time unit. There is a preset fourth mapping relationship between a time unit index of the fourth transmission time unit and a time unit index of the $i^{th}$ transmission time unit in the RAR time window, and i is a positive integer less than or equal to N.

A fourth aspect of the embodiments of the present invention provides a radio frame transmission method. The method includes sending, by a first wireless network device, physical random access channel (PRACH) trigger information to a second wireless network device, where the PRACH trigger information is carried in a first transmission time unit in a first radio frame. The method also includes receiving, by the first wireless network device, a preamble sequence sent by the second wireless network device in response to the PRACH trigger information, where the preamble sequence is carried in a second transmission time unit in a second radio frame. There is a preset first mapping relationship between a time unit index of the first transmission time unit and a time unit index of the second transmission time unit, and a structure of a transmission time unit in the first radio frame is different from a structure of a transmission time unit in the second radio frame.

In a first possible implementation of the fourth aspect, after the first wireless network device receives the preamble sequence that is carried in the second transmission time unit in the second radio frame and that is sent by the second wireless network device in response to the PRACH trigger information, the first wireless network device further performs the following operation: sending, by the first wireless network device to the second wireless network device, a random access response (RAR) carried in a third transmission time unit, where the third transmission time unit is any one of N transmission time units, the N transmission time units form an RAR time window used to detect the RAR, and N is a positive integer greater than 1. There is a preset second mapping relationship between a time unit index of the first transmission time unit in the RAR time window and the time unit index of the second transmission time unit.

In a second possible implementation of the fourth aspect, after the first wireless network device receives the preamble sequence that is carried in the second transmission time unit in the second radio frame and that is sent by the second wireless network device in response to the PRACH trigger information, the first wireless network device further performs the following operation: sending, by the first wireless network device, a random access response (RAR) to the second wireless network device, where the RAR is carried in a third transmission time unit, the third transmission time unit is any one of N transmission time units, the N transmission time units form an RAR time window used to detect the RAR, and N is a positive integer greater than 1. There is a preset third mapping relationship between a time unit index of the first transmission time unit in the RAR time window and the time unit index of the first transmission time unit.

With reference to the first or the second possible implementation of the fourth aspect, in a third possible implementation of the fourth aspect, the first wireless network device further performs the following operation: receiving, by the first wireless network device, an uplink shared channel (USCH) data block sent by the second wireless network device, where the USCH data block is carried in a fourth transmission time unit, and the USCH data block is sent by the second wireless network device when it is detected that an $i^{th}$ transmission time unit in the RAR time window carries physical downlink control channel (PDCCH) information scrambled by a random access radio network temporary identifier (RA-RNTI), and that a downlink data block corresponding to the PDCCH information includes the preamble sequence. There is a preset fourth mapping relationship between a time unit index of the fourth transmission time unit and a time unit index of the $i^{th}$ transmission time unit in the RAR time window, and i is a positive integer less than or equal to N.

In this application, the "transmission time unit" (or referred to as a "time unit") may be any one of a symbol, a subframe, a timeslot (or slot), or a mini-slot, or may include at least one subframe, at least one symbol, at least one timeslot, or at least one mini-slot. The time unit index is a sequence number used to identify a time unit. For example, when the time unit is defined as a subframe, the time unit index is corresponding to a subframe number. A difference in time unit structures includes a difference in duration of time units and/or a difference in quantities of symbols, subframes, timeslots, or mini-slots included in time units. For example, a time unit in the first radio frame may include at least one subframe, and a time unit in the second radio frame may include at least one timeslot; or time units in the first radio frame and the second radio frame each include at least one subframe, but duration of the subframe in the first radio frame is different from duration of the subframe in the second radio frame.

In this application, the "radio frame" is a time-domain resource unit defined in wireless communications. A radio frame may include at least one time unit, for example, a radio frame defined in the $3^{rd}$ Generation Partnership Project (3GPP) TS36.211 includes a plurality of subframes, and each subframe includes a plurality of symbols.

In this application, a difference in structures of the first radio frame and the second radio frame means that the first radio frame and the second radio frame are different in at least one of structures such as a subcarrier spacing, a cyclic prefix (CP), and a time unit, for example, include different structures of time units and/or include different quantities of time units. For example, the first radio frame includes L1 (L1≥1) time units, and each time unit is defined as a subframe; and the second radio fame includes L2 (L2≥1) time units, L1 is not equal to L2, and each time unit is defined as a subframe. For another example, the first radio frame and the second radio frame each include L3 (L3≥1) time units, a time unit in the first radio frame includes at least one subframe, and a time unit in the second radio frame includes at least one timeslot.

A fifth aspect of the embodiments of the present invention provides a second wireless network device. The device has a behavior function of implementing the method according to the first aspect or the third aspect, and the function may be implemented by hardware, or may be implemented by executing corresponding software by hardware. The hardware or the software includes one or more modules corresponding to the function.

A sixth aspect of the embodiments of the present invention provides a first wireless network device. The device has a behavior function of implementing the method according to the second aspect or the fourth aspect, and the function may be implemented by hardware, or may be implemented by executing corresponding software by hardware. The hardware or the software includes one or more modules corresponding to the function.

A seventh aspect of the embodiments of the present invention provides a second wireless network device. The device includes a memory and a processor coupled to the memory. The memory is configured to store instructions, and the processor is configured to run the instructions to perform some or all steps in any method according to the first aspect or the third aspect.

An eighth aspect of the embodiments of the present invention provides a first wireless network device. The device includes a memory and a processor coupled to the memory. The memory is configured to store instructions, and the processor is configured to run the instructions to perform some or all steps in any method according to the second aspect or the fourth aspect.

A ninth aspect of the embodiments of the present invention discloses a computer readable storage medium. The computer readable storage medium stores program code that can be executed by a second wireless network device, and the program code include instructions used to perform some or all steps in any method according to the first aspect or the third aspect.

A tenth aspect of the embodiments of the present invention discloses a computer readable storage medium. The computer readable storage medium stores program code that can be executed by a first wireless network device, and the program code includes instructions used to perform some or all steps in any method according to the second aspect or the fourth aspect.

In some possible implementations, the first transmission subframe and M1 transmission subframes in the second radio frame are in a same time period, and M1 is an integer greater than 1; and the preset first mapping relationship satisfies a formula: Subframe l=Subframe m+n, where Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

In some possible implementations, the preset second mapping relationship satisfies a formula: Subframe p=Subframe q+r, where Subframe p is the subframe number of the first transmission subframe in the RAR time window, Subframe q is the subframe number of the second transmission subframe, and r is a positive integer; or the preset second mapping relationship satisfies a formula: Subframe p=Subframe q1+r1, where Subframe p is the subframe number of the first transmission subframe in the RAR time window, Subframe q1 is a subframe number of a transmission subframe that is in the first radio frame and whose transmission time period includes a first time period, the first time period is a transmission time period of the second transmission subframe, and r1 is a positive integer; or the preset second mapping relationship satisfies a formula: Subframe p=Subframe q2+r2, where Subframe p is the subframe number of the first transmission subframe in the RAR time window, Subframe q2 is a subframe number of a transmission subframe that is in the first radio frame and whose transmission time period includes a second time period, the second time period is a transmission time period of a transmission subframe whose subframe number is Subframe q+w, Subframe q is the subframe number of the second transmission subframe, r2l is a positive integer, and w is a positive integer greater than 1.

In some possible implementations, the preset third mapping relationship satisfies a formula: Subframe x=Subframe y+z, where Subframe x is the subframe number of the first transmission subframe in the RAR time window, Subframe y is the subframe number of the first transmission subframe, and a value of z is a positive integer.

In some possible implementations, the RAR time window is in the first radio frame, a $k^{th}$ transmission subframe after the $i^{th}$ transmission subframe in the RAR time window and M2 transmission subframes in the second radio frame are in a same time period, M2 is an integer greater than 1, and k is 0 or a positive integer; and the preset fourth mapping relationship satisfies a formula: Subframe a=Subframe b1+c1, where Subframe a is the subframe number of the fourth transmission subframe, Subframe b1 is a subframe number of a $j^{th}$ transmission subframe in the M2 transmission subframes, c1 is 0 or a positive integer, and j is a positive integer less than or equal to M2; or the RAR time window is in the second radio frame; and the preset fourth mapping relationship satisfies a formula: Subframe a=Subframe b2+c2, where Subframe a is the subframe number of the fourth transmission subframe, Subframe b2 is a subframe number of a transmission subframe that is in the first radio frame and whose transmission time period includes a third time period, the third time period is a transmission time period of a transmission subframe whose subframe number is Subframe d+k, Subframe d is the subframe number of the $i^{th}$ transmission subframe in the RAR time window, c2 is 0 or a positive integer, and k is 0 or a positive integer.

Optionally, in the method according to the third aspect or the fourth aspect, the first mapping relationship, the second mapping relationship, the third mapping relationship, and the fourth mapping relationship that are between time units are similar to the foregoing mapping relationship between subframes, except that only the foregoing mapping relationship is in units of subframe, but in the method according to the third aspect or the fourth aspect, the mapping relationship is in units of time unit. It may be understood that the first mapping relationship, the second mapping relationship, the third mapping relationship, and the fourth mapping relationship in the first aspect, the second aspect, the third aspect, or the fourth aspect may be further designed in another form according to a system requirement. This is not limited in this application.

In some possible implementations, the first radio frame may be a radio frame of a first carrier, the second radio frame may be a radio frame of a second carrier, and a frequency band of the first carrier may be different from a frequency band of the second carrier. In a specific implementation, the first carrier may be a carrier whose frequency band is in a centimeter-wave band, and the second carrier may be a carrier whose frequency band is in a millimeter-wave band. Specific frequency bands of the first carrier and the second carrier are not uniquely limited in the embodiments of the present invention. In another specific implementation, the first carrier and the second carrier may be different frequency sub-bands, different subcarriers, or different frequency-domain parts in a same frequency band. For example, bandwidth of a frequency band is 20 MHz, the first carrier is 5 MHz in 20 MHz, and the second carrier is another 5 MHz in 20 MHz. The different frequency sub-bands, the different subcarriers, or the different frequency-domain parts in the same frequency band may be corresponding to different radio frame structures, for example, different frequency sub-bands, different subcarriers, or different frequency-domain pails of a same carrier may be different in at least one of structures such as a subcarrier spacing, a cyclic prefix (CP,), and a time unit. For example, different subcarrier spacings may be 15 KHz, 30 KHz, 60 KHz, or the like, different CPs may be normal CPs, extended CPs, or the like, and various time units may be defined, such as a subframe, a timeslot, or a mini-slot. For example, in a specific implementation, both time units on the first carrier and the second carrier are defined as subframes, but a first subframe on the first carrier may be corresponding to a plurality of second subframes on the second carrier.

In other possible implementations, the frequency band of the first carrier may be the same as the frequency band of the second carrier, but a frame structure used by the first carrier is different from a frame structure used by the second carrier. Specific frame structures of the first carrier and the second carrier are not uniquely limited in the embodiments of the present invention.

The first wireless network device includes a base station or user equipment, and the second wireless network device includes a base station or user equipment. In addition, because a subframe number of a transmission subframe is in one-to-one correspondence with a time location of the transmission subframe, a time location of the transmission subframe in a radio frame is determined once a subframe number of the transmission subframe is determined. Both the first wireless network device and the second wireless network device can determine the time location of the transmission subframe by determining the subframe number of the transmission subframe.

It can be learned from the foregoing description that, in the embodiments of the present invention, the second wireless network device and the first wireless network device transmit the first radio frame and the second radio frame, the first wireless network device sends, to the second wireless network device, the PRACH trigger information carried in the first transmission subframe in the first radio frame, and after receiving the PRACH trigger information, based on a correspondence that is between the subframe number of the first transmission subframe and the subframe number of the second transmission subframe in the second radio frame and that is defined in the preset first mapping relationship and the subframe number of the received first transmission subframe, the second wireless network device determines the subframe number of the second transmission subframe, and sends, to the first wireless network device, the preamble sequence carried in the second transmission subframe, so as to implement PRACH scheduling transmission between the second wireless network device and the first wireless network device. The structure of the transmission subframe in the first radio frame is different from the structure of the transmission subframe in the second radio frame. It can be learned that wireless network devices in the solutions can implement PRACH scheduling transmission between the wireless network devices based on cooperation between radio frames with different structures.

BRIEF DESCRIPTION OF THE DRAWINGS

The following briefly describes the accompanying drawings describing embodiments of the present invention.

FIG. 1 is a simplified application scenario diagram of a communications system according to an embodiment of the invention;

FIG. 1.1 is a schematic diagram of a frame structure to which a solution that supports cross-carrier PRACH scheduling transmission and that is specified in an existing protocol is applicable;

FIG. 2.1 is an example diagram of a frame structure that is of a radio frame and that includes a first mapping relationship according to an embodiment of the present invention;

FIG. 2.1-*a* is an example diagram of another frame structure that is of a radio frame and that includes a first mapping relationship according to an embodiment of the present invention;

FIG. 2.2 is an example diagram of a frame structure that is of a radio frame and that includes a second mapping relationship according to an embodiment of the present invention;

FIG. 2.3 is an example diagram of another frame structure that is of a radio frame and that includes a second mapping relationship according to an embodiment of the present invention;

FIG. 2.3-*a* is an example diagram of another frame structure that is of a radio frame and that includes a second mapping relationship according to an embodiment of the present invention;

FIG. 2.4 is an example diagram of another frame structure that is of a radio frame and that includes a second mapping relationship according to an embodiment of the present invention;

FIG. 2.4-*a* is an example diagram of another frame structure that is of a radio frame and that includes a second mapping relationship according to an embodiment of the present invention;

FIG. 2.5 is an example diagram of a frame structure that is of a radio frame and that includes a third mapping relationship according to an embodiment of the present invention;

FIG. 2.6A and FIG. 2.6B are an example diagram of a frame structure that is of a radio frame and that includes a fourth mapping relationship according to an embodiment of the present invention;

FIG. 2.6-*a* is an example diagram of another frame structure that is of a radio frame and that includes a fourth mapping relationship according to an embodiment of the present invention;

FIG. 2.7 is an example diagram of a frame structure that is of a radio frame and that includes a fourth mapping relationship according to an embodiment of the present invention;

FIG. 2.7-*a* is an example diagram of another frame structure that is of a radio frame and that includes a fourth mapping relationship according to an embodiment of the present invention;

DETAILED DESCRIPTION OF ILLUSTRATIVE EMBODIMENTS

Figure 2:
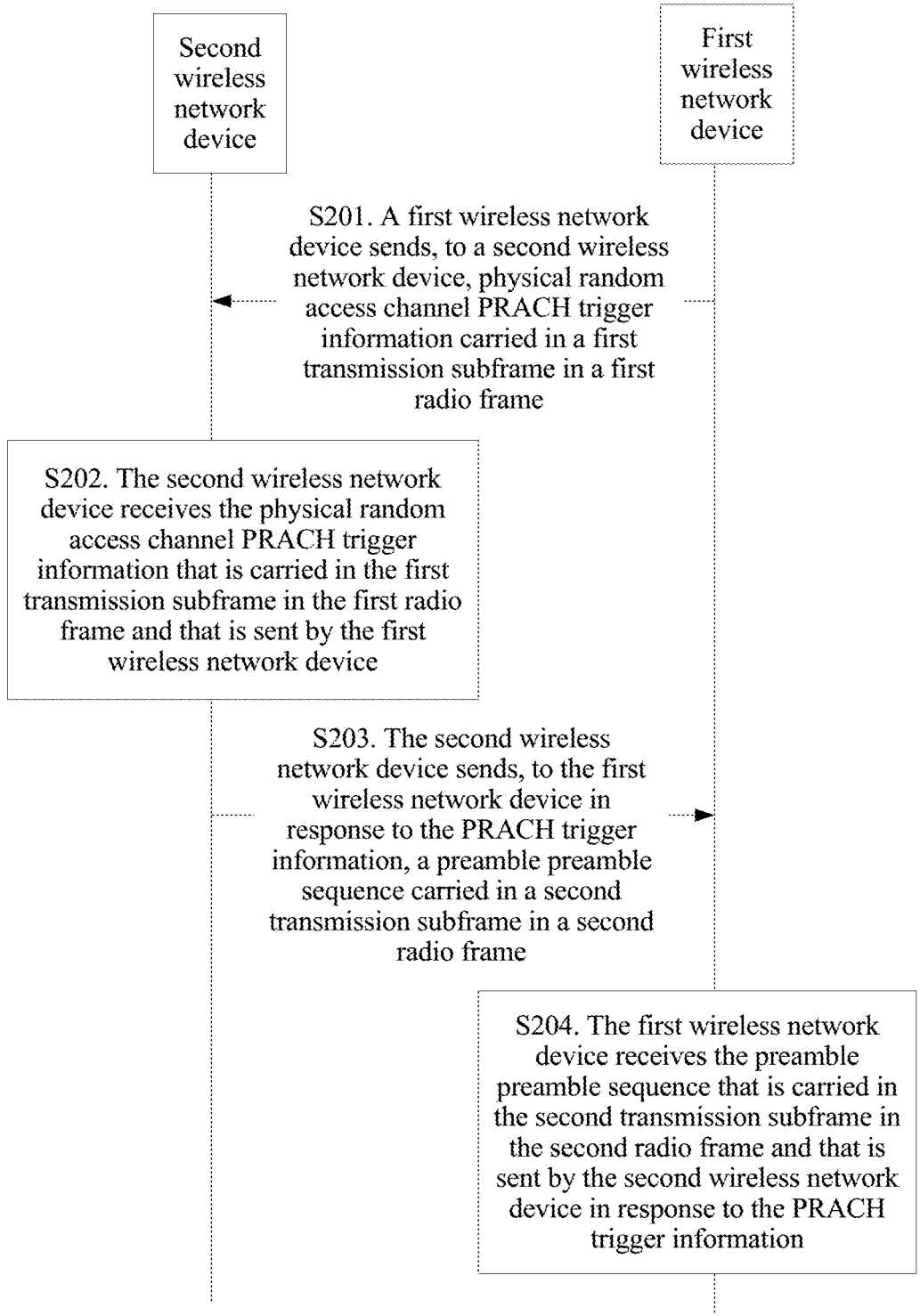
FIG. 2 is a schematic flowchart of a radio frame transmission method according to an embodiment of the present invention.

The following describes the technical solutions in the embodiments of the present invention with reference to the accompanying drawings in the embodiments of the present invention.

The technical solutions in the embodiments of the present invention may be applied to a hybrid networking communications system of an LTE (Long Term Evolution) RAT (radio access technology) and a 5G ($5^{th}$ Generation) RAT, or another multi-carrier communications system, or a communications system in which a same carrier has a plurality of frame structures. A specific wireless communications system is not limited in the present invention. For example, the LTE RAT may be an LTE FDD (frequency division duplex) system, an LTE TDD (time division duplex) system, or a full-duplex system. FIG. 1 is a simplified network architecture diagram of a communications system according to an embodiment of the present invention. As shown in the figure, the communications system includes at least one or more network side devices and one or more terminals. The terminal includes user equipment (UE), and the network side device includes a base station, a network controller, a mobile switching center, or the like. The terminal may communicate with the network side device, or may communicate with another terminal, for example, communicate in a D2D (device-to-device) scenario or an M2M (machine-to-machine) scenario. The network side device may communicate with the terminal, or may communicate with another network side device, for example, communication between a macro base station and an access point.

In the embodiments of the present invention, a wireless network device (including a first wireless network device and a second wireless network device) includes the network side device and/or the terminal in the wireless communications system.

An application scenario in which the first wireless network device is a base station and the second wireless network device is user equipment is used as an example to describe a communications system network architecture. Another case (both the first wireless network device and the second wireless network device are user equipment, or both the first wireless network device and the second wireless network device are base stations, or the first wireless network device is user equipment and the second wireless network device is a base station) is similar to the application scenario. Details are not described in the embodiments. The base station includes various types of devices that can provide a base station function, for example, a device that provides the base station function in a 2G ($2^{nd}$ telephone communications technology specification) network includes a BTS (base transceiver station) and a BSC (base station controller), a device that provides the base station function in a 3G ($3^{rd}$ Generation) network includes a NodeB and an RNC (radio network controller), a device that provides the base station function in a 4G ($4^{th}$ Generation mobile communication) network includes an eNB (evolved NodeB), and a device that provides the base station function in a WLAN (wireless local area network) is an AP (access point). The user equipment is a terminal device, and includes a movable terminal device and an immovable terminal device. The user equipment may be distributed in a network. The user equipment has different names in different networks, such as a terminal, a mobile station, a subscriber unit, a station, a cellular phone, a personal digital assistant, a wireless modem, a wireless communications device, a handheld device, a laptop computer, a cordless phone, or a wireless local loop station. The user equipment may communicate with one or more core networks by using an RAN (radio access network) (an access part of a wireless communications network), for example, exchange a voice and/or data with the radio access network.

To facilitate understanding of the technical solutions in the embodiments of the present invention, a solution that supports cross-carrier physical random access channel (PRACH) scheduling transmission between user equipment and a base station and that is specified in an existing wireless communications protocol standard is described herein. As shown in FIG. 1.1, a frame structure of a first radio frame on a first carrier is the same as a frame structure of a second radio frame on a second carrier. If UE receives PRACH trigger information on a PDCCH (physical downlink control channel), where the PRACH trigger information is carried in a first transmission subframe whose subframe number is Subframe n and that is in the first radio frame on the first carrier, the UE sends a random access preamble sequence to a base station in response to the received PRACH trigger information. The preamble sequence is carried in a second transmission subframe whose subframe number is Subframe i+k2 (k2 is greater than or equal to 6) and that is in the second radio frame on the second carrier, and a transmission subframe whose subframe number is Subframe i and the first transmission subframe whose subframe number is Subframe n are in a same time period.

It can be learned that, for an application scenario in which the frame structure of the first radio frame is the same as the frame structure of the second radio frame, the foregoing interaction process has been proposed in the prior art to implement PRACH scheduling transmission between the base station and the user equipment. However, for an application scenario in which radio frames have different frame structures, for example, in a CA (carrier aggregation) scenario of a hybrid networking communications system of an LTE RAT and a 5G RAT, a subframe on a carrier is corresponding to a plurality of subframes on another carrier, and no feasible interaction procedure has been currently proposed to implement PRACH scheduling transmission between wireless network devices.

In this application, the "subframe" or the "transmission subframe" is a "time unit" or a "transmission time unit". A structure, duration, or the like of a time unit in a time domain may be set according to a system requirement. This is not limited in this application. Optionally, the time unit may be further directly defined as a symbol, a timeslot, a mini-slot, or the like, or include at least one symbol, at least one subframe, at least one timeslot, at least one mini-slot, or the like. The solution in this embodiment of the present invention may be applied to a time unit such as a symbol, a timeslot, or a mini-slot, or be applied to a time unit such as at least one symbol, at least one subframe, at least one timeslot, or at least one mini-slot. A specific implementation is the same as that performed when a subframe is used as the time unit. Details are not described.

Based on this, referring to FIG. 2, FIG. 2 is a schematic flowchart of a radio frame transmission method according to a method embodiment of the present invention. As shown in FIG. 2, the radio frame transmission method includes the following steps.

S201. A first wireless network device sends, to a second wireless network device, physical random access channel (PRACH) trigger information carried in a first transmission subframe in a first radio frame.

The PRACH trigger information may be specifically a physical downlink control channel order (PDCCH order).

S202. The second wireless network device receives the physical random access channel (PRACH) trigger information that is carried in the first transmission subframe in the first radio frame and that is sent by the first wireless network device.

S203. The second wireless network device sends, to the first wireless network device in response to the PRACH trigger information, a preamble sequence carried in a second transmission subframe in a second radio frame.

There is a preset first mapping relationship between a subframe number of the first transmission subframe and a subframe number of the second transmission subframe, and a structure of a transmission subframe in the first radio frame is different from a structure of a transmission subframe in the second radio frame.

S204. The first wireless network device receives the preamble sequence that is carried in the second transmission subframe in the second radio frame and that is sent by the second wireless network device in response to the PRACH trigger information.

There is the preset first mapping relationship between the subframe number of the first transmission subframe and the subframe number of the second transmission subframe, and the structure of the transmission subframe in the first radio frame is different from the structure of the transmission subframe in the second radio frame.

It should be noted that the preset first mapping relationship may be pre-written by a developer into the second wireless network device and the first wireless network device, or be sent to the second wireless network device and the first wireless network device by another service device in a communications system, or the first wireless network device sends, to the second wireless network device, signaling that indicates the preset first mapping relationship, or the like. A specific manner of obtaining the first mapping relationship is not uniquely limited in this embodiment of the present invention.

It can be learned that, in this embodiment of the present invention, the second wireless network device and the first wireless network device transmit the first radio frame and the second radio frame, the first wireless network device sends, to the second wireless network device, the PRACH trigger information carried in the first transmission subframe in the first radio frame, and after receiving the PRACH trigger information, based on a correspondence that is between the subframe number of the first transmission subframe and the subframe number of the second transmission subframe in the second radio frame and that is defined in the preset first mapping relationship and the subframe number of the received first transmission subframe, the second wireless network device determines the subframe number of the second transmission subframe, and sends, to the first wireless network device, the preamble sequence carried in the second transmission subframe, so as to implement PRACH scheduling transmission between the second wireless network device and the first wireless network device. The structure of the transmission subframe in the first radio frame is different from the structure of the transmission subframe in the second radio frame. It can be learned that the wireless network devices in this solution can implement PRACH scheduling transmission between the wireless network devices based on cooperation between radio frames with different structures.

Optionally, in this embodiment of the present invention, the first transmission subframe and M1 transmission subframes in the second radio frame are in a same time period, and M1 is an integer greater than 1; and the preset first mapping relationship satisfies a formula: Subframe l=Subframe m+n, where Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

For example, FIG. 2.1 is an example diagram of a frame structure that is of a radio frame and that includes a first mapping relationship according to an embodiment of the present invention.

In a radio frame structure example Case 1 in FIG. 2.1, it can be learned that a value of M1 is 5, that is, the first transmission subframe in the first radio frame and five transmission subframes in the second radio frame are in a same time period; a value of t is 1, that is, Subframe m is a subframe number of the first transmission subframe in the five transmission subframes; and a value of n is 6, and it may be determined from Subframe l=Subframe m+n that the subframe number, that is, Subframe l, of the second transmission subframe is a subframe number Subframe m+6.

In addition, when a start moment of a subframe in the first radio frame and a start moment of a subframe in the second radio frame are not synchronous, a start moment and an end moment of the M1 transmission subframes and a start moment and an end moment of the first transmission subframe may not be totally synchronous. In this case, a transmission subframe corresponding to the start moment of the M1 transmission subframes, that is, the first transmission subframe in the M1 transmission subframes, may be determined based on the following operation: obtaining the start moment of the first transmission subframe, and determining, as the first transmission subframe in the M1 transmission subframes, a transmission subframe whose start moment is the closest to the start moment of the first transmission subframe.

For example, referring to FIG. 2.1-a, FIG. 2.1-a is an example diagram of another frame structure that is of a radio frame and that includes a first mapping relationship according to an embodiment of the present invention.

In a radio frame structure example in FIG. 2.1-a, it can be learned that a value of M1 is 5, a start moment of a transmission subframe m is the closest to the start moment of the first transmission subframe, and it is determined that the transmission subframe m is the first transmission subframe in five transmission subframes; a value of t is 1, that is, Subframe m is a subframe number of the first transmission subframe in the five transmission subframes; and a value of n is 6, and it may be determined from Subframe l=Subframe m+n that the subframe number, that is, Subframe l, of the second transmission subframe is a subframe number Subframe m+6.

In a radio frame structure example Case 2 in FIG. 2.1, it can be learned that a value of M1 is 5, that is, the first transmission subframe in the first radio frame and five transmission subframes in the second radio frame are in a same time period; a value of t is 5, that is, Subframe m is a subframe number of the fifth transmission subframe in the five transmission subframes; and a value of n is 5, and it may be determined from Subframe l=Subframe m+n that the subframe number, that is, Subframe l, of the second transmission subframe is a subframe number Subframe m+5.

In a radio frame structure example Case 3 in FIG. 2.1, it can be learned that a value of M1 is 5, that is, the first transmission subframe in the first radio frame and five transmission subframes in the second radio frame are in a same time period; a value of t is 4, that is, Subframe m is a subframe number of the fourth transmission subframe in the five transmission subframes; and a value of n is 3, and it may be determined from Subframe l=Subframe m+n that the subframe number, that is, Subframe l, of the second transmission subframe is a subframe number Subframe m+3.

Optionally, in this embodiment of the present invention, after the first wireless network device receives the preamble sequence that is carried in the second transmission subframe in the second radio frame and that is sent by the second wireless network device in response to the PRACH trigger information, the first wireless network device sends, to the second wireless network device, a random access response (RAR) carried in a third transmission subframe, where the third transmission subframe is any one of N transmission subframes, the N transmission subframes form an RAR time window used to detect the RAR, and N is a positive integer greater than 1, where there is a preset second mapping relationship between a subframe number of the first transmission subframe in the RAR time window and the subframe number of the second transmission subframe; or the second wireless network device detects, in a random access response (RAR) time window, an RAR sent by the first wireless network device, where the RAR sent by the first wireless network device is carried in a third transmission subframe, the RAR time window includes N transmission subframes, the third transmission subframe is any one of the N transmission subframes, and N is a positive integer, where there is a preset second mapping relationship between a subframe number of the first transmission subframe in the RAR time window and the subframe number of the second transmission subframe.

Further optionally, in this embodiment of the present invention, the preset second mapping relationship satisfies a formula: Subframe p=Subframe q+r, where Subframe p is the subframe number of the first transmission subframe in the RAR time window, Subframe q is the subframe number of the second transmission subframe, and r is a positive integer. Because the second transmission subframe is in the second radio frame, it can be learned from the foregoing mapping relationship between the subframe numbers that the first transmission subframe in the RAR time window is an $r^{th}$ transmission subframe after the second transmission subframe.

For example, referring to FIG. 2.2, FIG. 2.2 is an example diagram of a frame structure that is of a radio frame and that includes a second mapping relationship according to an embodiment of the present invention.

In a radio frame structure example shown in FIG. 2.2, it can be learned that, in the figure, Subframe q is the subframe number of the second transmission subframe; and a value of r is 5, and it may be determined from Subframe p=Subframe q+r that the subframe number, that is, Subframe p, of the first transmission subframe in the RAR time window is Subframe q+5, that is, the first transmission subframe in the RAR time window is the fifth transmission subframe after the second transmission subframe.

Further optionally, in this embodiment of the present invention, the preset second mapping relationship satisfies a formula: Subframe p=Subframe q1 +r1, where Subframe p is the subframe number of the first transmission subframe in the RAR time window, Subframe q1 is a subframe number of a transmission subframe that is in the first radio frame and whose transmission time period includes a first time period, the first time period is a transmission time period of the second transmission subframe, and r1 is a positive integer.

For example, referring to FIG. 2.3, FIG. 2.3 is an example diagram of another frame structure that is of a radio frame and that includes a second mapping relationship according to an embodiment of the present invention.

In a radio frame structure example shown in FIG. 2.3, it can be learned that, in the figure, a transmission time period of a transmission subframe whose subframe number is Subframe q is a first time period, and a transmission time period of a transmission subframe whose subframe number is Subframe q1 includes the first time period; and a value of r1 is 2, and it may be determined from Subframe p=Subframe q1+r1 that the subframe number, that is, Subframe p, of the first transmission subframe in the RAR time window is Subframe q1+2.

In addition, when a start moment of a subframe in the first radio frame and a start moment of a subframe in the second radio frame are not synchronous, the transmission time period of the second transmission subframe may overlap some transmission time periods of two adjacent transmission subframes in the first radio frame. In this case, it is necessary to determine that a subframe number of any one of the two transmission subframes is Subframe q1. It is assumed that subframe numbers of the two transmission subframes are respectively Subframe q1a and Subframe q1a+1, a wireless network device may determine that Subframe q1a is Subframe q1, or determine that Subframe q1a+1 is Subframe q1. In addition, it should be noted that policies, preset in the first wireless network device and the second wireless network device, for determining Subframe q1 need to be the same.

For example, referring to FIG. 2.3-a, FIG. 2.3-a is an example diagram of another frame structure that is of a radio frame and that includes a second mapping relationship according to an embodiment of the present invention.

In a radio frame structure example in FIG. 2.3-a, it can be learned that a transmission time period of the second transmission subframe whose subframe number is Subframe q1 is a first time period, the first time period overlaps some transmission time periods of a transmission subframe whose subframe number is Subframe q1a and a transmission subframe whose subframe number is Subframe q1a+1, and a policy for determining Subframe q1 is Subframe q1=Subframe q1a; and a value of r1 is 2, and it may be determined from Subframe p=Subframe q1+r1 that the subframe number, that is, Subframe p, of the first transmission subframe in the RAR time window is Subframe q1a+2.

Further optionally, in this embodiment of the present invention, the preset second mapping relationship satisfies a formula: Subframe p=Subframe q2+r2, where Subframe p is the subframe number of the first transmission subframe in the RAR time window, Subframe q2 is a subframe number of a transmission subframe that is in the first radio frame and whose transmission time period includes a second time period, the second time period is a transmission time period of a transmission subframe whose subframe number is Subframe q+w, Subframe q is the subframe number of the second transmission subframe, r2 is a positive integer, and w is a positive integer greater than 1.

For example, referring to FIG. 2.4, FIG. 2.4 is an example diagram of another frame structure that is of a radio frame and that includes a second mapping relationship according to an embodiment of the present invention.

In a radio frame structure example Case 1 shown in FIG. 2.4, it can be learned that, in the figure, the subframe number of the second transmission subframe is Subframe q, and w=3, that is, a transmission time period of a transmission subframe whose subframe number is Subframe q+3 is a second time period, and a transmission time period of a transmission subframe whose subframe number is Subframe q2 includes the second time period; and a value of r2 is 1, and it may be determined from Subframe p=Subframe q2+r2 that the subframe number, that is, Subframe p, of the first transmission subframe in the RAR time window is Subframe q2+1.

In a radio frame structure example Case 2 shown in FIG. 2.4, it can be learned that, in the figure, the subframe number of the second transmission subframe is Subframe q, and w=3, that is, a transmission time period of a transmission subframe whose subframe number is Subframe q+3 is a second time period, and a transmission time period of a transmission subframe whose subframe number is Subframe q2 includes the second time period; and a value of r2 is 1, and it may be determined from Subframe p=Subframe q2+r2 that the subframe number, that is, Subframe p, of the first transmission subframe in the RAR time window is Subframe q2+1.

In addition, when a start moment of a subframe in the first radio frame and a start moment of a subframe in the second radio frame are not synchronous, the transmission time period of the transmission subframe whose subframe number is Subframe q+w may overlap some transmission time periods of two adjacent transmission subframes in the first radio frame. In this case, it is necessary to determine that a subframe number of any one of the two transmission subframes is Subframe q2. It is assumed that subframe numbers of the two transmission subframes are respectively Subframe q2a and Subframe q2a+1, a wireless network device may determine that Subframe q2a is Subframe q2, or a wireless network device may determine that Subframe q2a+1 is Subframe q2. In addition, it should be noted that policies, preset in the first wireless network device and the second wireless network device, for determining Subframe q2 need to be the same.

For example, referring to FIG. 2.4-a, FIG. 2.4-a is an example diagram of another frame structure that is of a radio frame and that includes a second mapping relationship according to an embodiment of the present invention.

In a radio frame structure example in FIG. 2.4-a, it can be learned that a transmission time period of a transmission subframe whose subframe number is Subframe q+3 is a second time period, the second time period overlaps some transmission time periods of a transmission subframe whose subframe number is Subframe q2a and a transmission subframe whose subframe number is Subframe q2a+1, and a policy for determining Subframe q2 is Subframe q2=Subframe q2a; and a value of r2 is 1, and it may be determined from Subframe p=Subframe q2+r2 that the subframe number, that is, Subframe p, of the first transmission subframe in the RAR time window is Subframe q2a+1.

Optionally, in this embodiment of the present invention, after the first wireless network device receives the preamble sequence that is carried in the second transmission subframe in the second radio frame and that is sent by the second wireless network device in response to the PRACH trigger information, the first wireless network device sends, to the second wireless network device, a random access response (RAR) carried in a third transmission subframe, where the third transmission subframe is any one of N transmission subframes, the N transmission subframes form an RAR time window used to detect the RAR, and N is a positive integer greater than 1, where there is a preset third mapping relationship between a subframe number of the first transmission subframe in the RAR time window and the subframe number of the first transmission subframe; or the second wireless network device detects, in a random access response (RAR) time window, an RAR sent by the first wireless network device, where the RAR sent by the first wireless network device is carried in a third transmission subframe, the RAR time window includes N transmission subframes, the third transmission subframe is any one of the N transmission subframes, and N is a positive integer, where there is a preset third mapping relationship between a subframe number of the first transmission subframe in the RAR time window and the subframe number of the first transmission subframe.

Further optionally, in this embodiment of the present invention, the preset third mapping relationship satisfies a formula: Subframe x=Subframe y+z, where Subframe x is the subframe number of the first transmission subframe in the RAR time window, Subframe y is the subframe number of the first transmission subframe, and a value of z is a positive integer.

For example, referring to FIG. 2.5, FIG. 2.5 is an example diagram of a frame structure that is of a radio frame and that includes a third mapping relationship according to an embodiment of the present invention.

In a radio frame structure example shown in FIG. 2.5, it can be learned that the subframe number of the first transmission subframe is Subframe y; and a value of z is 3, and it may be determined from Subframe x=Subframe y+z that the subframe number, that is, Subframe x, of the first transmission subframe in the RAR time window is Subframe y+3.

Optionally, in this embodiment of the present invention, the method further includes: if it is detected that an $i^{th}$ transmission subframe in the RAR time window carries physical downlink control channel (PDCCH) information scrambled by a random access radio network temporary identifier (RA-RNTI), and that a downlink data block corresponding to the PDCCH information includes the preamble sequence, sending, by the second wireless network device to the first wireless network device, an uplink shared channel (USCH) data block carried in a fourth transmission subframe, where there is a preset fourth mapping relationship between a subframe number of the fourth transmission subframe and a subframe number of the $i^{th}$ transmission subframe in the RAR time window, and i is a positive integer less than or equal to N; or receiving, by the first wireless network device, an uplink shared channel (USCH) data block that is carried in a fourth transmission subframe and that is sent by the second wireless network device, where the USCH data block is sent by the second wireless network device when it is detected that an $i^{th}$ transmission subframe in the RAR time window carries physical downlink control channel (PDCCH) information scrambled by a random access radio network temporary identifier (RA-RNTI), and that a downlink data block corresponding to the PDCCH information includes the preamble sequence, where there is a preset fourth mapping relationship between a subframe number of the fourth transmission subframe and a subframe number of the $i^{th}$ transmission subframe in the RAR time window, and i is a positive integer less than or equal to N.

Further optionally, in this embodiment of the present invention, the RAR time window is in the first radio frame, a $k^{th}$ transmission subframe after the $i^{th}$ transmission subframe in the RAR time window and M2 transmission subframes in the second radio frame are in a same time period, M2 is an integer greater than 1, and k is 0 or a positive integer; and the preset fourth mapping relationship satisfies a formula: Subframe a=Subframe b1+c1, where Subframe a is the subframe number of the fourth transmission subframe, Subframe b1 is a subframe number of a $j^{th}$ transmission subframe in the M2 transmission subframes, c1 is 0 or a positive integer, and j is a positive integer less than or equal to M2.

For example, referring to FIG. 2.6A and FIG. 2.6B, FIG. 2.6A and FIG. 2.6B are an example diagram of a frame structure that is of a radio frame and that includes a fourth mapping relationship according to an embodiment of the present invention.

In a radio frame structure example Case 1 shown in FIG. 2.6A and FIG. 2.6B, it can be learned that the RAR time window is in the first radio frame, a value of i is 1, a value of k is 0, and a value of M2 is 5, that is, the first transmission subframe in the RAR time window and five transmission subframes in the second radio frame are in a same time period; a value of j is 1, that is, a subframe number of the first transmission subframe in the five transmission subframes is Subframe b1; and a value of c1 is 6, and it may be determined from Subframe a=Subframe b1+c1 that the subframe number, that is, Subframe a, of the fourth transmission subframe is Subframe b1+6.

In a radio frame structure example Case 2 shown in FIG. 2.6A and FIG. 2.6B, it can be learned that the RAR time window is in the first radio frame, a value of i is 2, a value of k is 0, and a value of M2 is 5, that is, the second transmission subframe in the RAR time window and five transmission subframes in the second radio frame are in a same time period; a value of j is 5, that is, a subframe number of the fifth transmission subframe in the five transmission subframes is Subframe b1; and a value of c1 is 6, and it may be determined from Subframe a=Subframe b1+c1 that the subframe number, that is, Subframe a, of the fourth transmission subframe is Subframe b1+6.

In a radio frame structure example Case 3 shown in FIG. 2.6A and FIG. 2.6B, it can be learned that the RAR time window is in the first radio frame, a value of i is 2, a value of k is 2, and a value of M2 is 5, that is, the second transmission subframe after the second transmission subframe in the RAR time window and five transmission subframes in the second radio frame are in a same time period; a value of j is 1, that is, a subframe number of the first transmission subframe in the five transmission subframes is Subframe b1; and a value of c1 is 0, and it may be determined from Subframe a=Subframe b1+c1 that the subframe number, that is, Subframe a, of the fourth transmission subframe is Subframe b1+0.

In addition, when a start moment of a subframe in the first radio frame and a start moment of a subframe in the second radio frame are not synchronous, a start moment and an end moment of the M2 transmission subframes and a start moment and an end moment of the first transmission subframe may not be totally synchronous. In this case, a transmission subframe corresponding to the start moment of the M2 transmission subframes, that is, the first transmission subframe in the M2 transmission subframes, may be determined based on the following operation: obtaining a start moment of the $k^{th}$ transmission subframe after the $i^{th}$ transmission subframe in the RAR time window, and determining, as the first transmission subframe in the M2 transmission subframes, a transmission subframe whose start moment is the closest to the start moment of the $k^{th}$ transmission subframe.

For example, FIG. 2.6-a is an example diagram of another frame structure that is of a radio frame and that includes a fourth mapping relationship according to an embodiment of the present invention.

In a radio frame structure example in FIG. 2.6-a, it can be learned that a value of M2 is 5, a value of i is 2, a value of k is 2, a start moment of a transmission subframe m is the closest to a start moment of the second transmission subframe after the second transmission subframe in the RAR time window, and it is determined that the transmission subframe m is the first transmission subframe in five transmission subframes; a value of j is 4, that is, a subframe number of the fourth transmission subframe in the five transmission subframes is Subframe b1; and a value of c1 is 0, and it may be determined from Subframe a=Subframe b1+c1 that the subframe number, that is, Subframe a, of the fourth transmission subframe is Subframe b1+0.

Further optionally, in this embodiment of the present invention, the RAR time window is in the second radio frame; and the preset fourth mapping relationship satisfies a formula: Subframe a=Subframe b2+c2, where Subframe a is the subframe number of the fourth transmission subframe, Subframe b2 is a subframe number of a transmission subframe that is in the first radio frame and whose transmission time period includes a third time period, the third time period is a transmission time period of a transmission subframe whose subframe number is Subframe d+k, Subframe d is the subframe number of the $i^{th}$ transmission subframe in the RAR time window, c2 is 0 or a positive integer, and k is 0 or a positive integer.

For example, FIG. 2.7 is an example diagram of a frame structure that is of a radio frame and that includes a fourth mapping relationship according to an embodiment of the present invention.

In a radio frame structure example Case 1 shown in FIG. 2.7, it can be learned that a value of i is 5, that is, a subframe number of the fifth transmission subframe in the RAR time window is Subframe d; a value of k is 4, that is, a transmission time period of a transmission subframe whose subframe number is Subframe d+4 is a third time period, and accordingly, a transmission time period of a transmission subframe whose subframe number is Subframe b2 includes the third time period; and a value of c2 is 0, and it may be determined from Subframe a=Subframe b2+c2 that the subframe number, that is, Subframe a, of the fourth transmission subframe is Subframe b2+0.

In a radio frame structure example Case 2 shown in FIG. 2.7, it can be learned that a value of i is 1, that is, a subframe number of the first transmission subframe in the RAR time window is Subframe d; a value of k is 3, that is, a transmission time period of a transmission subframe whose subframe number is Subframe d+3 is a third time period, and a transmission time period of a transmission subframe whose subframe number is Subframe b2 includes the third time period; and a value of c2 is 1, and it may be determined from Subframe a=Subframe b2+c2 that the subframe number, that is, Subframe a, of the fourth transmission subframe is Subframe b2+1.

In addition, when a start moment of a subframe in the first radio frame and a start moment of a subframe in the second radio frame are not synchronous, the transmission time period of the transmission subframe whose subframe number is Subframe d+k may overlap some transmission time periods of two transmission subframes in the first radio frame. In this case, it is necessary to determine that a subframe number of any one of the two transmission subframes is Subframe b2. It is assumed that subframe numbers of the two transmission subframes are respectively Subframe b2a and Subframe b2a+1, a wireless network device may determine that Subframe b2 a is Subframe b2, or a wireless network device may determine that Subframe b2a+1 is Subframe b2.

For example, referring to FIG. 2.7-a, FIG. 2.7-a is an example diagram of another frame structure that is of a radio frame and that includes a fourth mapping relationship according to an embodiment of the present invention.

In a radio frame structure example in FIG. 2.7-a, it can be learned that a value of i is 5, that is, a subframe number of the fifth transmission subframe in the RAR time window is Subframe d; a value of k is 4, that is, a transmission time period of a transmission subframe whose subframe number is Subframe d+4 is a third time period, the third time period overlaps some transmission time periods of transmission subframes whose subframe numbers are Subframe b2a and Subframe b2a+1 and that are in the first radio frame, and a preset policy for determining Subframe b2 is Subframe b2=Subframe b2a+1; and a value of c2 is 0, and it may be determined from Subframe a=Subframe b2+c2 that the subframe number, that is, Subframe a, of the fourth transmission subframe is Subframe b2+0.

It should be noted that, because a subframe number of a transmission subframe is in one-to-one correspondence with a time location of the transmission subframe, a time location of the transmission subframe in a radio frame is determined once a subframe number of the transmission subframe is determined. Both the second wireless network device and the first wireless network device can determine the time location of the transmission subframe by determining the subframe number of the transmission subframe.

Figure 3:
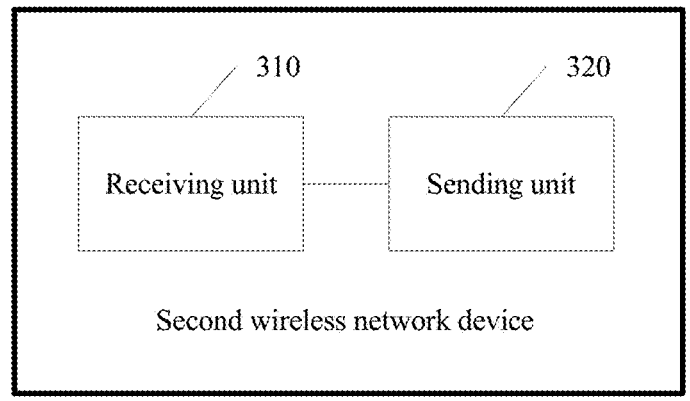
FIG. 3 is a schematic structural diagram of user equipment according to an embodiment of the present invention.

FIG. 3 is a schematic structural diagram of a second wireless network device according to an embodiment of the present invention. The second wireless network device is the second wireless network device in the radio frame transmission method described in FIG. 2. As shown in the figure, the second wireless network device in this embodiment of the present invention may include at least a receiving unit 310 and a sending unit 320.

The receiving unit 310 is configured to receive physical random access channel (PRACH) trigger information that is carried in a first transmission subframe in a first radio frame and that is sent by a first wireless network device.

The sending unit 320 is configured to send, to the first wireless network device in response to the PRACH trigger information, a preamble sequence carried in a second transmission subframe in a second radio frame. There is a preset first mapping relationship between a subframe number of the first transmission subframe and a subframe number of the second transmission subframe, and a structure of a transmission subframe in the first radio frame is different from a structure of a transmission subframe in the second radio frame.

Optionally, after the sending unit 320 sends, to the first wireless network device, the preamble sequence carried in the second transmission subframe in the second radio frame, the second wireless network device further includes: a first detection unit, configured to detect, in a random access response (RAR) time window, an RAR sent by the first wireless network device, where the RAR sent by the first wireless network device is carried in a third transmission subframe, the RAR time window includes N transmission subframes, the third transmission subframe is any one of the N transmission subframes, and N is a positive integer.

There is a preset second mapping relationship between a subframe number of the first transmission subframe in the RAR time window and the subframe number of the second transmission subframe.

Optionally, the preset second mapping relationship satisfies a formula: Subframe p=Subframe q+r, where Subframe p is the subframe number of the first transmission subframe in the RAR time window, Subframe q is the subframe number of the second transmission subframe, and r is a positive integer.

Alternatively, the preset second mapping relationship satisfies a formula: Subframe p=Subframe q1+r1, where Subframe p is the subframe number of the first transmission subframe in the RAR time window, Subframe q1 is a subframe number of a transmission subframe that is in the first radio frame and whose transmission time period includes a first time period, the first time period is a transmission time period of the second transmission subframe, and r1 is a positive integer.

Alternatively, the preset second mapping relationship satisfies a formula: Subframe p=Subframe q2+r2, where Subframe p is the subframe number of the first transmission subframe in the RAR time window, Subframe q2 is a subframe number of a transmission subframe that is in the first radio frame and whose transmission time period includes a second time period, the second time period is a transmission time period of a transmission subframe whose subframe number is Subframe q+w, Subframe q is the subframe number of the second transmission subframe, r2 is a positive integer, and w is a positive integer greater than 1.

Optionally, after the sending unit 320 sends, to the first wireless network device, the preamble sequence carried in the second transmission subframe in the second radio frame, the second wireless network device further includes: a second detection unit, configured to detect, in a random access response (RAR) time window, an RAR sent by the first wireless network device, where the RAR sent by the first wireless network device is carried in a third transmission subframe, the RAR time window includes N transmission subframes, and N is a positive integer.

There is a preset third mapping relationship between a subframe number of the first transmission subframe in the RAR time window and the subframe number of the first transmission subframe.

Optionally, the preset third mapping relationship satisfies a formula: Subframe x=Subframe y+z, where Subframe x is the subframe number of the first transmission subframe in the RAR time window, Subframe y is the subframe number of the first transmission subframe, and a value of z is a positive integer.

Optionally, the first transmission subframe and M1 transmission subframes in the second radio frame are in a same time period, and M1 is an integer greater than 1; and the preset first mapping relationship satisfies a formula: Subframe l=Subframe m+n, where Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

It should be noted that the foregoing description is merely a brief description of the second wireless network device in this embodiment of the present invention. For a specific implementation process, implementation, and example, refer to the embodiment described in FIG. 2. Details are not described herein again.

Figure 4:
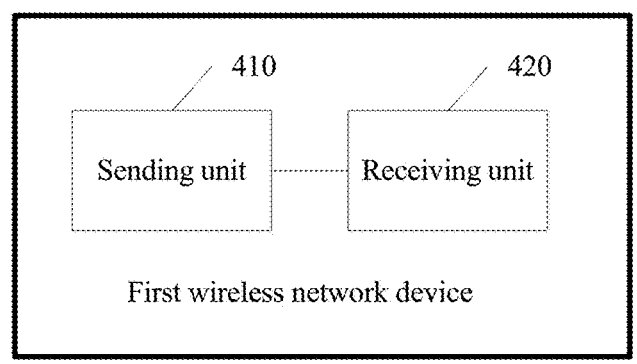
FIG. 4 is a schematic structural diagram of a base station according to an embodiment of the present invention.

FIG. 4 is a schematic structural diagram of a first wireless network device according to an embodiment of the present invention. The first wireless network device is the first wireless network device in the radio frame transmission method described in FIG. 2. As shown in the figure, the first wireless network device in this embodiment of the present invention may include at least a sending unit 410 and a receiving unit 420.

The sending unit 410 is configured to send, to a second wireless network device, physical random access channel (PRACH) trigger information carried in a first transmission subframe in a first radio frame.

The receiving unit 420 is configured to receive a preamble sequence that is carried in a second transmission subframe in a second radio frame and that is sent by the second wireless network device in response to the PRACH trigger information. There is a preset first mapping relationship between a subframe number of the first transmission subframe and a subframe number of the second transmission subframe, and a structure of a transmission subframe in the first radio frame is different from a structure of a transmission subframe in the second radio frame.

Optionally, after the receiving unit 420 receives the preamble sequence that is carried in the second transmission subframe in the second radio frame and that is sent by the second wireless network device in response to the PRACH trigger information, the sending unit 410 is further configured to: send, to the second wireless network device, a random access response (RAR) carried in a third transmission subframe, where the third transmission subframe is any one of N transmission subframes, the N transmission subframes form an RAR time window used to detect the RAR, and N is a positive integer greater than 1.

There is a preset second mapping relationship between a subframe number of the first transmission subframe in the RAR time window and the subframe number of the second transmission subframe.

Optionally, the preset second mapping relationship satisfies a formula: Subframe p=Subframe q+r, where Subframe p is the subframe number of the first transmission subframe in the RAR time window, Subframe q is the subframe number of the second transmission subframe, and r is a positive integer.

Alternatively, the preset second mapping relationship satisfies a formula: Subframe p=Subframe q1+r1, where Subframe p is the subframe number of the first transmission subframe in the RAR time window, Subframe q1 is a subframe number of a transmission subframe that is in the first radio frame and whose transmission time period includes a first time period, the first time period is a transmission time period of the second transmission subframe, and r1 is a positive integer.

Alternatively, the preset second mapping relationship satisfies a formula: Subframe p=Subframe q2+r2, where Subframe p is the subframe number of the first transmission subframe in the RAR time window, Subframe q2 is a subframe number of a transmission subframe that is in the first radio frame and whose transmission time period includes a second time period, the second time period is a transmission time period of a transmission subframe whose subframe number is Subframe q+w, Subframe q is the subframe number of the second transmission subframe, r2 is a positive integer, and w is a positive integer greater than 1.

Optionally, after the receiving unit 420 receives the preamble sequence that is carried in the second transmission subframe in the second radio frame and that is sent by the second wireless network device in response to the PRACH trigger information, the sending unit 410 is further configured to: send, to the second wireless network device, a random access response (RAR) carried in a third transmission subframe, where the third transmission subframe is any one of N transmission subframes, the N transmission subframes form an RAR time window used to detect the RAR, and N is a positive integer greater than 1.

There is a preset third mapping relationship between a subframe number of the first transmission subframe in the RAR time window and the subframe number of the first transmission subframe.

Optionally, the preset third mapping relationship satisfies a formula: Subframe x=Subframe y+z, where Subframe x is the subframe number of the first transmission subframe in the RAR time window, Subframe y is the subframe number of the first transmission subframe, and a value of z is a positive integer.

Optionally, the first transmission subframe and M1 transmission subframes in the second radio frame are in a same time period, and M1 is an integer greater than 1; and the preset first mapping relationship satisfies a formula: Subframe l=Subframe m+n, where Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

It should be noted that the foregoing description is merely a brief description of the second wireless network device in this embodiment of the present invention. For a specific implementation process, implementation, and example, refer to the embodiment described in FIG. 2. Details are not described herein again.

Figure 5:
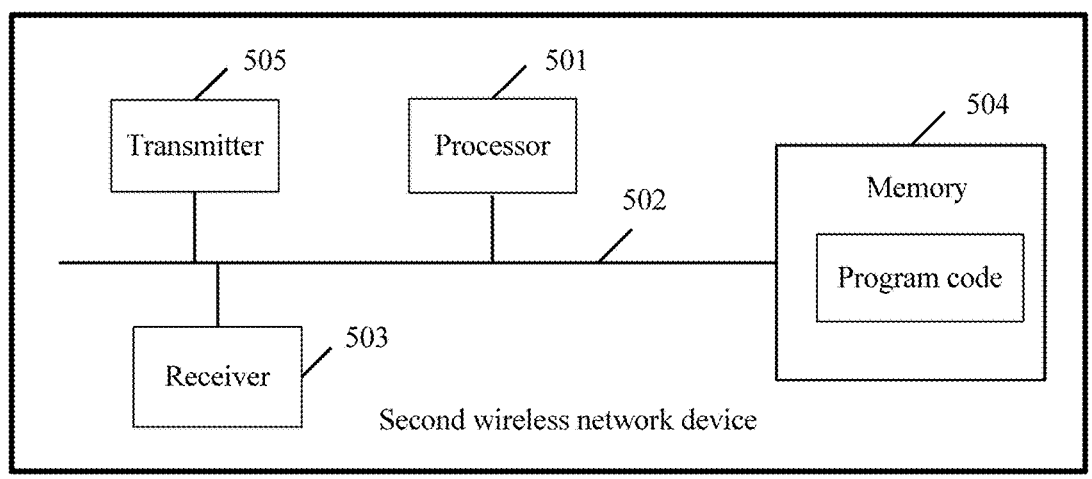
FIG. 5 is a schematic structural diagram of another user equipment according to an embodiment of the present invention.

FIG. 5 is a schematic structural diagram of another second wireless network device according to an embodiment of the present invention. As shown in FIG. 5, the second wireless network device may include at least one processor 501 such as a CPU, at least one communications bus 502, at least one receiver 503, a memory 504, and a transmitter 505. The communications bus 502 is configured to implement connection and communication between these components. The transmitter 505 is configured to perform signaling or data communication with another node device. The memory 504 may be a high-speed RAM, or may be a non-volatile memory, for example, at least one magnetic disk storage. Optionally, the memory 504 may be at least one storage apparatus far away from the foregoing processor 501. The memory 504 stores a group of program code, and the processor 501 is configured to invoke the program code stored in the memory 504 to perform the following operations: receiving physical random access channel (PRACH) trigger information that is carried in a first transmission subframe in a first radio frame and that is sent by a first wireless network device; and sending, to the first wireless network device in response to the PRACH trigger information, a preamble sequence carried in a second transmission subframe in a second radio frame, where there is a preset first mapping relationship between a subframe number of the first transmission subframe and a subframe number of the second transmission subframe, and a structure of a transmission subframe in the first radio frame is different from a structure of a transmission subframe in the second radio frame.

Optionally, the first transmission subframe and M1 transmission subframes in the second radio frame are in a same time period, and M1 is an integer greater than 1; and the preset first mapping relationship satisfies a formula: Subframe l=Subframe m+n, where Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

For example, the second wireless network device may be user equipment.

Figure 6:
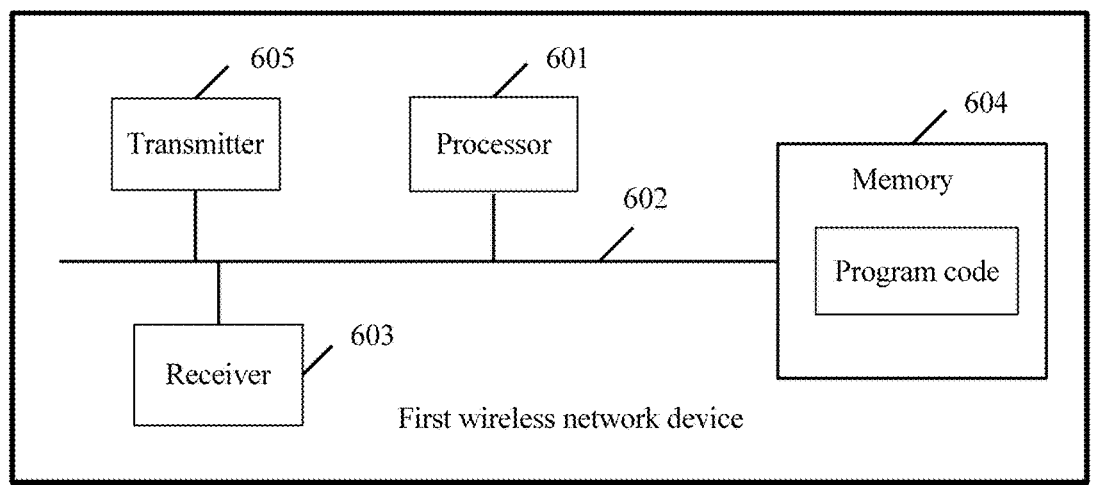
FIG. 6 is a schematic structural diagram of another base station according to an embodiment of the present invention.

FIG. 6 is a schematic structural diagram of another first wireless network device according to an embodiment of the present invention. As shown in FIG. 6, the first wireless network device may include at least one processor 601 such as a CPU, at least one communications bus 602, at least one receiver 603, a memory 604, and a transmitter 605. The communications bus 602 is configured to implement connection and communication between these components. The transmitter 605 is configured to perform signaling or data communication with another node device. The memory 604 may be a high-speed RAM, or may be a non-volatile memory, for example, at least one magnetic disk storage. Optionally, the memory 604 may be at least one storage apparatus far away from the foregoing processor 601. The memory 604 stores a group of program code, and the processor 601 is configured to invoke the program code stored in the memory 604 to perform the following operations: sending, to a second wireless network device, physical random access channel (PRACH) trigger information carried in a first transmission subframe in a first radio frame; and receiving a preamble sequence that is carried in a second transmission subframe in a second radio frame and that is sent by the second wireless network device in response to the PRACH trigger information, where there is a preset first mapping relationship between a subframe number of the first transmission subframe and a subframe number of the second transmission subframe, and a structure of a transmission subframe in the first radio frame is different from a structure of a transmission subframe in the second radio frame.

Optionally, the first transmission subframe and M1 transmission subframes in the second radio frame are in a same time period, and M1 is an integer greater than 1; and the preset first mapping relationship satisfies a formula: Subframe l=Subframe m+n, where Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

For example, the first wireless network device may be a base station.

A person of ordinary skill in the art may understand that all or some of the processes of the foregoing method embodiments may be implemented by computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A method, comprising:
   receiving physical random access channel (PRACH) trigger information sent by a first wireless network device, wherein the PRACH trigger information is carried in a first transmission subframe in a first radio frame; and
   in response to receiving the PRACH trigger information, sending, to the first wireless network device, a preamble sequence, wherein the preamble sequence is carried in a second transmission subframe in a second radio frame, wherein there is a preset first mapping relationship between a subframe number of the first transmission subframe and a subframe number of the second transmission subframe, and a structure of the first transmission subframe in the first radio frame is different from a structure of the second transmission subframe in the second radio frame.

2. The method according to claim 1, wherein after sending the preamble sequence, the method further comprises:
   detecting, in a random access response (RAR) time window, an RAR sent by the first wireless network device, wherein the RAR sent by the first wireless network device is carried in a third transmission subframe, the RAR time window comprises N transmission subframes, the third transmission subframe is any one of the N transmission subframes, and N is a positive integer, wherein there is a preset second mapping relationship between a subframe number of an earliest transmission subframe of the N transmission subframes in the RAR time window and the subframe number of the second transmission subframe.

3. The method according to claim 2, wherein the preset second mapping relationship satisfies a relation: Subframe p=Subframe q+r, wherein Subframe p is the subframe number of the earliest transmission subframe of the N transmission subframes in the RAR time window, Subframe q is the subframe number of the second transmission subframe, and r is a positive integer.

4. The method according to claim 2, wherein the preset second mapping relationship satisfies a relation: Subframe p=Subframe q1+r1, wherein Subframe p is the subframe number of the earliest transmission subframe of the N transmission subframes in the RAR time window, Subframe q1 is a subframe number of a fourth transmission subframe that is in the first radio frame and whose transmission time period comprises a first time period, the first time period is a transmission time period of the second transmission subframe, and r1 is a positive integer.

5. The method according to claim 2, wherein the preset second mapping relationship satisfies a relation: Subframe p=Subframe q2+r2, wherein Subframe p is the subframe number of the earliest transmission subframe of the N transmission subframes in the RAR time window, Subframe q2 is a subframe number of a fifth transmission subframe that is in the first radio frame and whose transmission time period comprises a second time period, the second time period is a transmission time period of a sixth transmission subframe whose subframe number is Subframe q+w, Subframe q is the subframe number of the second transmission subframe, r2 is a positive integer, and w is a positive integer greater than 1.

6. The method according to claim 2, further comprising:
   when it is detected that an $i^{th}$ transmission subframe in the RAR time window carries physical downlink control channel (PDCCH) information scrambled by a random access radio network temporary identifier (RA-RNTI), and that a downlink data block corresponding to the PDCCH information comprises the preamble sequence, sending, to the first wireless network device, an uplink shared channel (USCH) data block carried in a fourth transmission subframe;
   wherein there is a preset fourth mapping relationship between a subframe number of the fourth transmission subframe and a subframe number of the $i^{th}$ transmission subframe in the RAR time window, and i is a positive integer less than or equal to N.

7. The method according to claim 6, wherein the RAR time window is in the first radio frame, a $k^{th}$ transmission subframe after the $i^{th}$ transmission subframe in the RAR time window and M2 transmission subframes in the second radio frame are in a same time period, M2 is an integer greater than 1, and k is 0 or a positive integer; and
   wherein the preset fourth mapping relationship satisfies a relation: Subframe a=Subframe b1+c1, wherein Subframe a is the subframe number of the fourth transmission subframe, Subframe b1 is a subframe number of a $j^{th}$ transmission subframe in the M2 transmission subframes, c1 is 0 or a positive integer, and j is a positive integer less than or equal to M2.

8. The method according to claim 6, wherein the RAR time window is in the second radio frame, and the preset fourth mapping relationship satisfies a relation: Subframe a=Subframe b2+c2, wherein Subframe a is the subframe number of the fourth transmission subframe, Subframe b2 is a subframe number of a fifth transmission subframe that is in the first radio frame and whose transmission time period comprises a third time period, the third time period is a transmission time period of a sixth transmission subframe whose subframe number is Subframe d+k, Subframe d is the subframe number of the $i^{th}$ transmission subframe in the RAR time window, c2 is 0 or a positive integer, and k is 0 or a positive integer.

9. The method according to claim 1, wherein after sending the preamble sequence, the method further comprises:
   detecting, in a random access response (RAR) time window, an RAR sent by the first wireless network device, wherein the RAR sent by the first wireless network device is carried in a third transmission subframe, the RAR time window comprises N transmission subframes, and N is a positive integer;

wherein there is a preset third mapping relationship between a subframe number of an earliest transmission subframe of the N transmission subframes in the RAR time window and the subframe number of the first transmission subframe.

10. The method according to claim 9, wherein the preset third mapping relationship satisfies a relation: Subframe x=Subframe y+z, wherein Subframe x is the subframe number of the earliest transmission subframe of the N transmission subframes in the RAR time window, Subframe y is the subframe number of the first transmission subframe, and a value of z is a positive integer.

11. The method according to claim 1, wherein the first transmission subframe and M1 transmission subframes in the second radio frame are in a same time period, and M1 is an integer greater than 1; and
wherein the preset first mapping relationship satisfies a relation: Subframe l=Subframe m+n, wherein Subframe l is the subframe number of the second transmission subframe, Subframe m is a subframe number of a $t^{th}$ transmission subframe in the M1 transmission subframes, n is 0 or a positive integer, and t is a positive integer less than or equal to M1.

12. An apparatus, comprising:
a processor;
a non-transitory memory;
a communications interface; and
a bus, wherein the processor, the communications interface, and the memory communicate with each other using the bus;
wherein the non-transitory memory stores executable program code; and
wherein the processor is configured to execute the executable program code to:
receive physical random access channel (PRACH) trigger information sent by a first wireless network device, wherein the PRACH trigger information is carried in a first transmission subframe in a first radio frame; and
in response to receiving the PRACH trigger information, send, to the first wireless network device, a preamble sequence carried in a second transmission subframe in a second radio frame, wherein there is a preset first mapping relationship between a subframe number of the first transmission subframe and a subframe number of the second transmission subframe, and a structure of the first transmission subframe in the first radio frame is different from a structure of the second transmission subframe in the second radio frame.

13. The apparatus according to claim 12, wherein the processor is configured to further execute the executable program code to:
detect, in a random access response (RAR) time window, an RAR sent by the first wireless network device, wherein the RAR sent by the first wireless network device is carried in a third transmission subframe, the RAR time window comprises N transmission subframes, the third transmission subframe is any one of the N transmission subframes, and N is a positive integer, wherein there is a preset second mapping relationship between a subframe number of an earliest transmission subframe of the N transmission subframes in the RAR time window and the subframe number of the second transmission subframe.

14. The apparatus according to claim 13, wherein the preset second mapping relationship satisfies a relation: Subframe p=Subframe q+r, wherein Subframe p is the subframe number of the earliest transmission subframe of the N transmission subframes in the RAR time window, Subframe q is the subframe number of the second transmission subframe, and r is a positive integer.

15. The apparatus according to claim 13, wherein the preset second mapping relationship satisfies a relation: Subframe p=Subframe q1+r1, wherein Subframe p is the subframe number of the earliest transmission subframe of the N transmission subframes in the RAR time window, Subframe q1 is a subframe number of a fourth transmission subframe that is in the first radio frame and whose transmission time period comprises a first time period, the first time period is a transmission time period of the second transmission subframe, and r1 is a positive integer.

16. A non-transitory computer-readable storage medium comprising instructions which, when executed by a computer, cause the computer to:
receive physical random access channel (PRACH) trigger information sent by a first wireless network device, wherein the PRACH trigger information is carried in a first transmission subframe in a first radio frame; and
send, to the first wireless network device in response to the PRACH trigger information, a preamble sequence carried in a second transmission subframe in a second radio frame, wherein there is a preset first mapping relationship between a subframe number of the first transmission subframe and a subframe number of the second transmission subframe, and a structure of the first transmission subframe in the first radio frame is different from a structure of the second transmission subframe in the second radio frame.

17. The non-transitory computer-readable storage medium according to claim 16, wherein the instructions, when executed by the computer, cause the computer to:
detect, in a random access response (RAR) time window, a RAR sent by the first wireless network device, wherein the RAR sent by the first wireless network device is carried in a third transmission subframe, the RAR time window comprises N transmission subframes, the third transmission subframe is any one of the N transmission subframes, and N is a positive integer, wherein there is a preset second mapping relationship between a subframe number of an earliest transmission subframe of the N transmission subframes in the RAR time window and the subframe number of the second transmission subframe.

18. The non-transitory computer-readable storage medium according to claim 17, wherein the preset second mapping relationship satisfies a relation: Subframe p=Subframe q2+r2, wherein Subframe p is the subframe number of the earliest transmission subframe of the N transmission subframes in the RAR time window, Subframe q2 is a subframe number of a fifth transmission subframe that is in the first radio frame and whose transmission time period comprises a second time period, the second time period is a transmission time period of a sixth transmission subframe whose subframe number is Subframe q+w, Subframe q is the subframe number of the second transmission subframe, r2 is a positive integer, and w is a positive integer greater than 1.

19. The non-transitory computer-readable storage medium according to claim 17, wherein the instructions, when executed by the computer, cause the computer to:
when it is detected that an $i^{th}$ transmission subframe in the RAR time window carries physical downlink control channel (PDCCH) information scrambled by a random access radio network temporary identifier (RA-RNTI), and that a downlink data block corresponding to the PDCCH information comprises the preamble sequence, sending, to the first wireless network device, an uplink shared channel (USCH) data block carried in a fourth transmission subframe;

wherein there is a preset fourth mapping relationship between a subframe number of the fourth transmission subframe and a subframe number of the $i^{th}$ transmission subframe in the RAR time window, and i is a positive integer less than or equal to N.

* * * * *